US011502895B1

(12) United States Patent
Van Oort et al.

(10) Patent No.: US 11,502,895 B1
(45) Date of Patent: Nov. 15, 2022

(54) INTERNET FAILOVER CONNECTIVITY AND MONITORING

(71) Applicant: R&D Industries, Inc., Milford, IA (US)

(72) Inventors: Christopher Van Oort, Ames, IA (US); Donald Van Oort, West Okoboji, IA (US)

(73) Assignee: R&D Industries, Inc., Milford, IA (US)

( * ) Notice: Subject to any disclaimer, the term of this patent is extended or adjusted under 35 U.S.C. 154(b) by 0 days.

(21) Appl. No.: 17/014,960

(22) Filed: Sep. 8, 2020

Related U.S. Application Data

(60) Provisional application No. 62/896,606, filed on Sep. 6, 2019.

(51) Int. Cl.
*H04L 41/0654* (2022.01)
*H04L 12/46* (2006.01)
*H04L 43/12* (2022.01)
*H04L 47/2441* (2022.01)

(52) U.S. Cl.
CPC ...... *H04L 41/0654* (2013.01); *H04L 12/4633* (2013.01); *H04L 43/12* (2013.01); *H04L 47/2441* (2013.01)

(58) Field of Classification Search
None
See application file for complete search history.

(56) References Cited

U.S. PATENT DOCUMENTS

| | | | | |
|---|---|---|---|---|
| 2011/0040440 A1* | 2/2011 | de Oliveira | ........ | G06Q 10/0631 701/29.5 |
| 2013/0091266 A1* | 4/2013 | Bhave | ........ | G06F 16/2452 709/224 |
| 2015/0032838 A1* | 1/2015 | Demsey | ........ | G06V 20/20 709/213 |
| 2019/0149482 A1* | 5/2019 | Kumar | ........ | H04L 67/1008 709/226 |
| 2019/0149508 A1* | 5/2019 | Silvestro | ........ | H04L 45/306 709/238 |
| 2020/0036624 A1* | 1/2020 | Michael | ........ | H04L 45/24 |
| 2020/0296012 A1* | 9/2020 | Paruchuri | ........ | H04L 43/0835 |
| 2020/0396150 A1* | 12/2020 | Dillon | ........ | H04L 12/4633 |

* cited by examiner

*Primary Examiner* — Younes Naji
(74) *Attorney, Agent, or Firm* — Dentons Davis Brown; Matthew Warner-Blankenship

(57) ABSTRACT

The disclosed implementations relate to a network monitoring and failover system and related devices and methods. Various implementations include a network having a local area network, a firewall, a server, and an SD-WAN monitoring system. The SD-WAN monitoring system is constructed and arranged to direct network traffic over various network connections according to a set a rules. The system is constructed and arranged to monitor and detect when a primary connection is not performing optimally and automatically route sensitive traffic to a secondary connect to minimize or eliminate network interruptions. The system is further constructed and arranged to automatically transition back to the primary connection when the network issues are resolved.

20 Claims, 19 Drawing Sheets

INTERNET FAILOVER CONNECTIVITY AND MONITORING

CROSS-REFERENCE TO RELATED APPLICATION(S)

This application claims the benefit under 35 U.S.C. § 119(e) to U.S. Provisional Application 62/896,606, filed Sep. 6, 2019, and entitled "Internet Failover Connectivity And Monitoring, which is hereby incorporated herein by reference in its entirety for all purposes.

TECHNICAL FIELD

The disclosed technology relates to various devices, systems and methods for providing and monitoring internet connectivity, and in particular relates to devices, systems, and methods for maintaining and monitoring uninterrupted internet connectivity with desirable performance characteristics. The disclosed technology may be implemented in a wide array of settings involving internet connectivity, such as in commercial, retail, industrial, residential, banking, and other settings.

BACKGROUND

Wide area networks (i.e., WANs) have long been used by companies and other organizations to connect physically separate offices, facilities, and other users to a common computer network. Since the advent of the internet, these dedicated computer networks have increasingly been replaced by software-defined wide area networks (e.g., software-defined WAN or SD-WAN). Software-defined WANs (SD-WANs) can reduce the cost of deploying dedicated networking hardware among and between multiple sites by implementing a virtualized network of sorts across the publicly available internet, thereby leveraging the already existing network and underlying devices that provide internet connectivity.

Traditionally, firewalls can be configured to determine the connection state of each network connection via monitoring an upstream device. Prior art monitoring techniques include various known protocols, such as ICMP or other TCP-based protocols including but not limited to DNS, HTTP or HTTPS to validate a connection by monitoring network traffic via a primary connection to see if the traffic is "reaching" a monitored host and inducing a networked response. Under these approaches, when the monitored upstream host fails to respond, the firewall can "failover" the connection to a secondary (or "failover") internet connection.

Once failed over, outbound and inbound internet traffic is routed via the secondary, or failover internet connection. Ideally, when these upstream monitoring approaches re-validate the primary internet connection, the firewall should switch, or "failback" to the primary connection. However, there are multiple modes of failure which can result in false positives or negatives in the connection validation and/or disrupt these approaches or prevent proper failover/failback switching.

Network devices such as firewalls can also be configured to failover in the sense that network traffic is routed to a secondary or other internet connection even when a primary internet connection is still operable. For example, a networking device may be able to detect less than ideal network conditions due to, e.g., traffic congestion. In such cases some traffic may be routed to a secondary connection to improve its transmission, which also reduces load on the primary connection(s) and improves overall network operation.

Network failures can occur or otherwise be triggered for any number of reasons. In traditional networking monitoring, users at a site might know a connection is down, congested and possibly failed over, but centralized or outsourced IT managers may not know for minutes or hours or even until staff or angry end users call to alert them. Further, since the aim of a network failover/failback system is to maintain connectivity, users may not even notice when network traffic is successfully switched among multiple internet connections.

While systems exist for implementing failover connectivity and monitoring, there is a need in the art for devices, systems, and methods with improved failover/failback connectivity and monitoring capabilities.

BRIEF SUMMARY

Disclosed herein are various devices, systems, and methods relating to providing and monitoring computer network connections. Implementations disclosed herein are directed to internet connections and wide area network (WAN) connections, though the disclosed technology is not limited to these networks and may be used with any suitable network type or communication protocol. Particularly, the disclosed implementations relate to certain network connection devices, systems, and methods for configuring and/or monitoring network characteristics such as connectivity, route of connection to the internet or other network, route changes, network congestion and other characteristics. As an example, in some cases the technology is useful for maintaining and monitoring consistent, quality network connections, despite a primary network connection that may be slow, interrupted, or experiencing network jitter or packet loss.

As discussed above, some systems exist for implementing failover connectivity and monitoring. Unfortunately, in many cases such existing systems are considered proprietary and can thus be difficult to integrate into a network environment that includes devices and software beyond that supported by the particular manufacturer of the proprietary solution. As will be discussed further, implementations of the technology disclosed herein are in some cases directed to devices, systems and methods with improved failover/failback connectivity and monitoring capabilities which support open standards without regard to a specific brand of hardware with specific software.

According to some implementations, data generated from monitoring the use of network traffic rules may in some cases be shared with network administrators and/or users via a graphical display such as, for example, a report or dashboard. In some implementations the disclosed technology is implemented within a software-defined wide area network (SD-WAN) and systems, devices and/or methods are directed to at least one of creating SD-WAN rules, configuring SD-WAN rules and monitoring the use of SD-WAN rules.

According to some implementations of the disclosed technology, a network failover and connection monitoring system is provided that includes, among other things, a server, a traffic classifier, a first network connection, and a second network connection. The traffic classifier is constructed and arranged to apply a set of network classifier rules to route traffic over the first network connection and the second network connection. A network device transitions between the first network connection and the second network connection in accordance with the rules.

In some cases the network classifier rules are SD-WAN classifier rules.

In some cases the first network connection is a wired connection.

In some cases the second network connection is a wireless connection.

In some cases the system further includes a dashboard in electronic communication with the server.

In some cases the system further includes a third network connection.

In some cases the network device is a failover device.

In some cases the monitoring system is constructed and arranged to monitor traffic flow.

In some cases the system further includes a probe constructed and arranged to validate connectivity.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
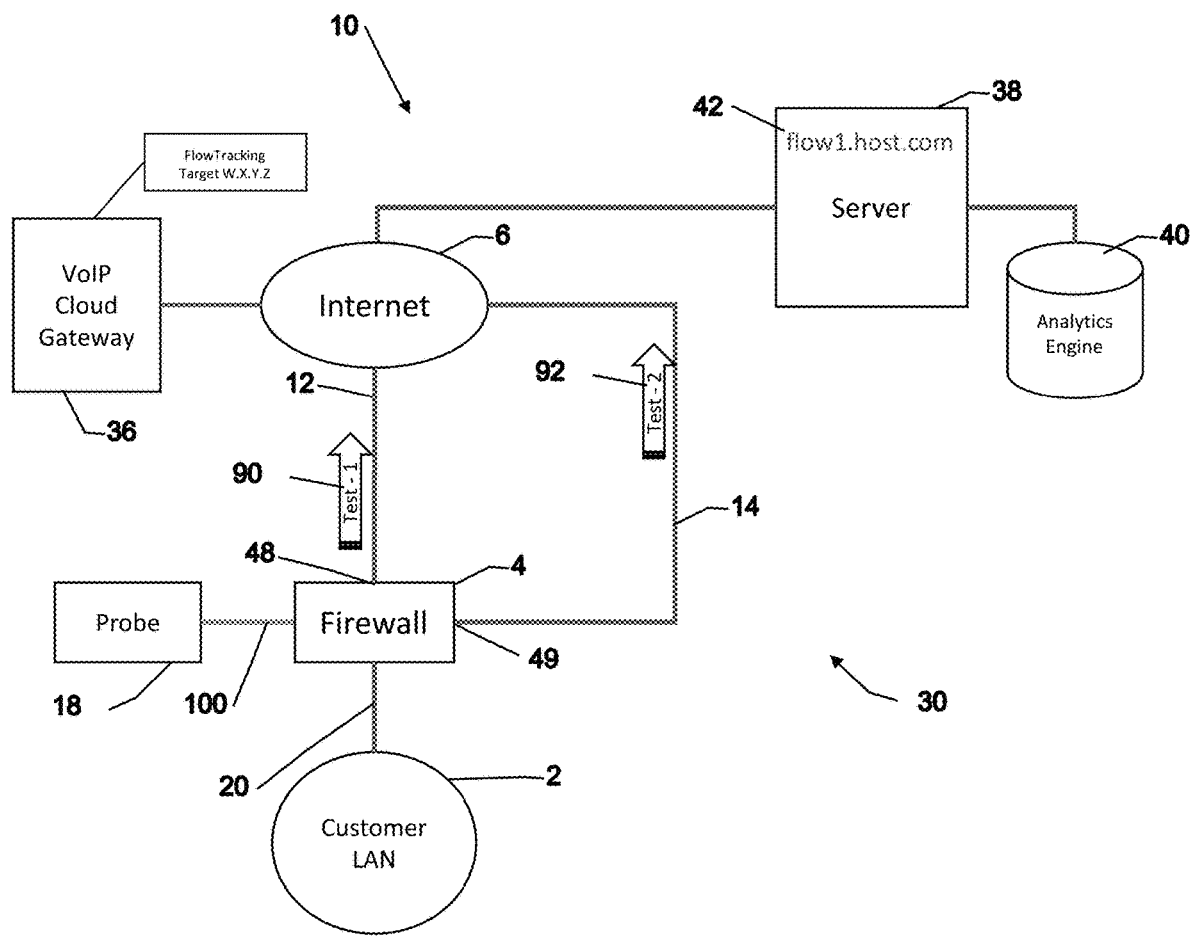
FIG. 1 is a schematic depiction of a network connected to the internet, in which the network includes an SD-WAN system and probe, according to one implementation.

The various implementations disclosed or contemplated herein relate to network monitoring and failover systems and associated devices and methods. In various implementations, the disclosed devices, systems and methods are directed to technologies that enable the monitoring of network connectivity, such as the ability to identify and/or predict failures, partial failures, and/or connection heuristics that resolve to intermittent errors, and then route traffic to a secondary or failover connection, or back from a secondary connection to the primary connection, as would be readily appreciated by those of skill in the art. That is, the system promotes the use of efficient and uninterrupted connections by utilizing a preferable connection at a particular time, be it the primary connection, secondary connection or another connection.

The disclosed technology can in some cases be implemented within software-defined wide area networks (SD-WANs). In some cases devices, systems and methods disclosed herein can create and/or modify SD-WAN rules in order to configure firewall settings to direct network traffic to one or more specific network connections. As an example, some implementations may enable the creation of special firewall rules to handle, for example, critical business applications and other network traffic (e.g., VoIP) that may be sensitive to a low-quality network connection. In such cases, the firewall monitors network connections, and when problems arise, the SD-WAN rules can cause the firewall to route sensitive traffic over more suitable connections. In some implementations the system may route traffic for a specific application over a different network connection during a period of network congestion while other traffic remains on a primary connection. In some cases certain traffic (e.g., a web app, video traffic and/or VoIP traffic) is routed over a secondary or failover connection that is wireless, such as, for example, a 4G/5G broadband cellular network or satellite-based network. In some cases the secondary or failover connection may be a wired or fiber connection.

Various implementations of the disclosed technology are described herein as applying to network connections and/or internet connections. While particular networks, such as the internet, are mentioned, it should be appreciated that implementations of the disclosed technology are not limited to internet connections. For example, implementations may also apply to wide area networks (WANs) and the connections thereto. Accordingly, as used herein, the terms "internet" and "network" are used interchangeably unless the context of the use dictates otherwise.

Various terminology schemes can be used to describe the use of primary and secondary connections and the activity of SD-WAN rules. In some implementations detecting that an SD-WAN connection is using the default connection is considered a "normal" state in which the firewall's SD-WAN rule is inactive. Conversely, an "active state" according to this scheme is defined as when the firewall detects problems which trigger the SD-WAN rule to route traffic over another connection (e.g., backup, secondary, failover connection) because the firewall's SD-WAN rule is actively routing traffic over the other connection. Further, while particular examples and implementations of the disclosed technology are described herein in terms of SD-WAN rules directing traffic flow out into an SD-WAN, this is only one example of how the disclosed technology may be more generally implemented with respect to network traffic rules operating within a computer network. It is contemplated that examples directed herein to SD-WAN are also applicable to other types of computer networks and network traffic rules as would be recognized by those of skill in the art.

As just one possible example, in some cases the disclosed technology can be applied to a private WAN connection. In such an example, a remote hospital may be connected to a primary hospital via VPN. The hospital may have ultra-critical traffic that is latency-sensitive such as medical telemetry data (monitoring vitals). In that case the flow-tracking would not normally egress to the internet and could switch between multiple VPN connections. Implementations of the traffic flow monitoring disclosed herein can in some cases monitor this type of traffic flow within the policy routing methods described in this patent.

Systems, devices and methods may be described herein as configuring and/or monitoring network traffic flowing through a "primary connection" and/or failing over or switching to a "secondary connection." The term "primary connection" is used herein to refer to a network connection that is a default selection or that is normally used, or at least used more often than other connections. The term "secondary connection" is used herein to mean a network connection other than the primary connection. Further, the disclosed technology is not exclusive to examples including only one primary connection and one backup or secondary connection. Thus it is understood that the examples and implementations described as having a primary connection and a secondary connection have at least one, and possibly more, of each type of connection unless stated otherwise, or as would otherwise be understood by those skilled in the art.

In various implementations, the system described herein is constructed and arranged to monitor a variety of SD-WAN flows to and from the cloud through one or more connections. In some cases the disclosed systems, devices and/or methods are equipped to load balance or otherwise optimize network performance. Some exemplary SD-WAN devices are therefore able to direct traffic through an optimal connection route in real time. In various implementations, a probe connected to the network determines the connectivity of multiple internet connections by generating and routing traffic out of the various connections. In various implementations SD-WAN business rules are utilized to monitor the traffic. It will be appreciated that these rules can be implemented regardless of manufacturer for the various network and connectivity components (hardware) and are also capable of monitoring connections of any type, such as, for example, IPv4, IPv6, 4G, 5G, fiber broadband, cable broadband, wireless broadband, satellite broadband, and DSL/HDSL.

In various additional implementations the devices, systems, and methods may identify and detect conditions within the network that cause a loss in transmission quality, such as signal loss, packet loss, latency issues and jitter, and employ policy routing rules which some refer to as SD-WAN traffic steering, to transition traffic to a more stable and/or higher quality connection. Several implementations and aspects of these approaches are described herein.

Various systems are known for monitoring network connections, such as those described in U.S. Pat. No. 10,616,347, which is hereby incorporated by reference. The devices, systems, and methods disclosed herein can be used in conjunction with systems described in U.S. Pat. No. 10,616,347 to improve network connectivity and performance. In some cases one or more aspects of the technology disclosed herein can be incorporated into and implemented by the devices, systems, and methods disclosed in U.S. Pat. No. 10,616,347. As disclosed in U.S. Pat. No. 10,616,347, networking systems can be constructed and arranged to transition traffic to a secondary connection when the primary connection fails. Disclosed herein are devices, systems and methods for implementing failover devices within software-defined wide area networks (SD-WANs). Also disclosed herein are devices, systems, and methods that allow for some or all traffic to transition to the secondary connection if the primary connection is not operating optimally, even if the primary connection is still available. Disclosed embodiments further enable monitoring of the traffic flows to assist in determining when and over what connections traffic is flowing.

As discussed above, network failures can occur for many reasons. In some cases centralized or outsourced IT managers may not learn of a failure for some time. In some cases users on a network may not notice connections issues ranging from slight congestion to latency problems to outright connection failure because a failover/failback system has successfully routed network traffic to different internet connection not experiencing those issues. In such cases there is a risk that primary connection issues and unexpected use of secondary internet connections may go unnoticed and unaddressed for longer than is recommended or desired. Implementations of the disclosed technology can advantageously raise awareness of such issues by monitoring the flow of network traffic through various internet connections. In some cases systems, devices and methods disclosed herein determine the flow of network traffic by monitoring the use of network traffic rules, such as SD-WAN rules.

In some implementations an SD-WAN monitoring system is configured to monitor a specific SD-WAN rule configured in the firewall. While examples disclosed herein discuss a firewall for implementing SD-WAN rules and other policies, it will be appreciated that SD-WAN rules as described herein may be implemented in a variety of different types of network devices (e.g., routers), computers, and components connected to a network may similarly implement SD-WAN rules and are not limited to firewalls. In some cases the SD-WAN rules may be incorporated into a dedicated, stand-alone networking device in communication with the firewall.

When the firewall (or other network device) detects a situation defined in the SD-WAN rule (e.g., thresholds for network lag, jitter, packet loss congestion or other triggering events), the firewall may switch traffic defined in the rule to be routed or steered over a different internet or other network connection. In some implementations the SD-WAN monitoring system detects when an SD-WAN rule is triggered and/or active and when the SD-WAN rule is inactive, meaning that associated network traffic is being routed along its primary network connection. In some implementations a firewall may be configured with multiple SD-WAN rules. In such cases, the SD-WAN monitoring system can be configured to monitor each separate SD-WAN rule.

According to certain implementations, an SD-WAN flow-monitoring rule is created which mirrors each individual SD-WAN traffic steering rule, so that as each SD-WAN rule becomes active, steering traffic over an alternate connection, that the change in the flow of traffic may be simultaneously monitored by the flow-monitoring rule by way of superposition. Therefore the flow-monitoring test packets mirror the path of the SD-WAN rule, allowing the state of the SD-WAN rule to be monitored without affecting the traffic and without the need to understand what is inside the traffic flow which may be encrypted or which may be a VPN or a GRE tunnel. FIGS. 17-20 depict aspects of these possible implementations.

Advantageously, this technique is independent of the protocol used for IPv4 or IPv6, and is also independent of the type of network. As long as the flow-tracking rule can mirror the behavior of the SD-WAN traffic flow, the flow-monitoring rule has the ability to mirror the change in the network path when the rule is triggered. As the path changes the monitoring system is simultaneously notified of the change by way of the super positioned monitoring traffic.

It should be noted that in some cases this technique will not work to detect changes within encrypted network flows which occur after the SD-WAN traffic steering rules are applied. For example if we have two remote offices Site-A, and Site-B. These remote offices are connected to the internet by two different connections into Site-A, and two different connections into Site-B. The company could build four GRE tunnels enabling all combinations of connections to be used. An SD-WAN router can then measure the performance across these four connections, and can steer traffic between the two offices using the best combination of connections. When this traffic steering occurs, the SD-WAN flow-monitoring (described herein) can detect (via superposition) which of these four VPN paths (connections) are in-use at any given time. Furthermore it can determine this without sending traffic across these four paths, and without interrupting any encryption occurring on these connections.

In further implementations, the SD-WAN monitoring system depicts one or more aspects of the monitoring through a visual display, such as a dashboard. In some cases a visual display includes a timeline. When the SD-WAN monitoring system detects that a SD-WAN rule is using a connection other than the one specified as the default connection, the timeline indicates that SD-WAN traffic is using a secondary or backup connection. This indication allows an administrator or end user to monitor SD-WAN traffic flows, allowing the person to know which connection is in use for each SD-WAN traffic flow.

Figure 2:
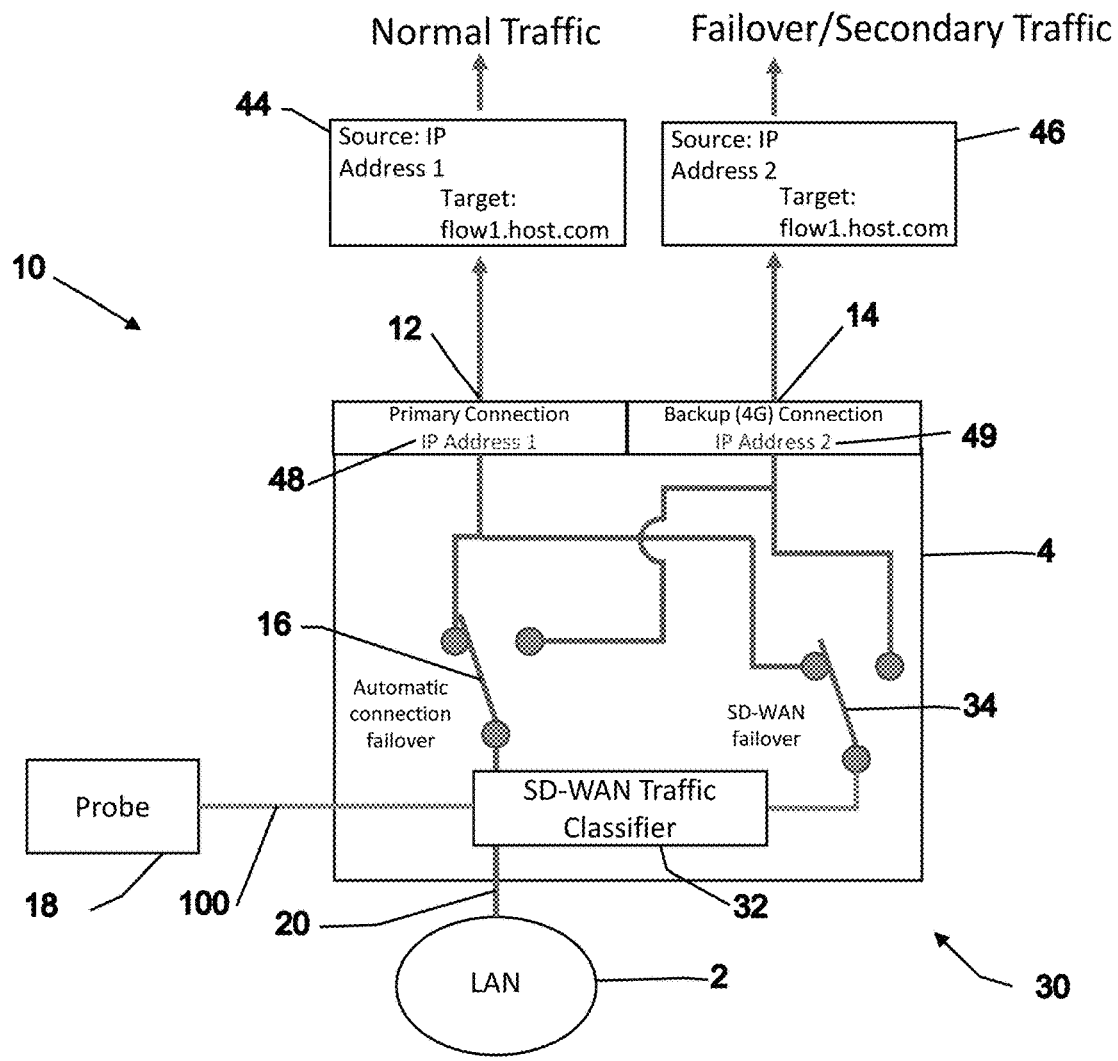
FIG. 2 is a partial schematic depiction of a network with an SD-WAN monitoring system, according to one implementation.

FIGS. 1 and 2 illustrate an example of an SD-WAN monitoring system 30 incorporated into/operating on a network 10. In this implementation, the network 10 includes two network connections that connect the network to the internet 6. In the illustrated implementation, the network connections include a primary connection 12 and a secondary connection 14 (also referred to herein as a "failover connection" or "backup connection"). In some cases more than two connections (e.g., two or more primary connections and/or two or more secondary/backup connections) may be provided. The network 10 is constructed and arranged to send network traffic 20 over the network connections 12, 14.

According to depicted example, the network 10 includes a local area network ("LAN") 2 connected to a firewall 4. The network 10 additionally includes a failover device 16. According to this implementation, the failover device 16 is constructed and arranged to transition the network traffic 20 between the primary connection 12 and the secondary connection 14 in the event of failure of the primary connection.

As shown in FIG. 2, the network and SD-WAN monitoring system 30 further include an SD-WAN traffic classifier 32 and an SD-WAN failover device 34. The SD-WAN monitoring system 30 is constructed and arranged to monitor and validate the network connections 12, 14 in accordance with various rules to determine how the network traffic should be routed between the primary connection 12 and secondary connection 14. In some implementations, the SD-WAN monitoring system 30 can automatically route specified traffic based on the performance of the various network connections 12, 14. In some implementations the SD-WAN failover device 34 is constructed and arranged to transition network traffic 20 from the primary connection 12 to the secondary connection 14, apart from the failover device 16. For example, the SD-WAN failover device 34 can be configured to switch network traffic based on rules, information, evaluations, and/or instructions, etc., from the SD-WAN traffic classifier 32 or another network device.

Continuing with reference to FIGS. 1-2, in some implementations the SD-WAN monitoring system 30 includes a probe 18 and a server 38 in communication with the network 10. In this example the probe 18 communicates with the firewall 4 and the SD-WAN classifier 32 over a probe network connection 100. In some implementations, the connections 12, 14 can be validated using the probe 18. For example, in some cases the probe 18 generates network traffic that is routed to the server 38 and then analyzed by the server 38 and/or an analysis engine 40 in communication with the server 38. In some cases the traffic is analyzed to determine the status of the internet connections and/or which internet connections are being used by various SD-WAN rules.

In various implementations, the SD-WAN monitoring system 30 can test for one or more network performance characteristics such as packet loss, latency, and jitter. The SD-WAN monitoring system 30 may further include rules that set threshold values for each of the tests such that when the thresholds are not met, the traffic identified by the SD-WAN rules is routed to the secondary/failover connection 14. In some cases the identified traffic may be routed to the failover connection 14 even when the primary connection 12 is still up. The SD-WAN traffic classifier 32 directs the traffic among the various connections 12, 14 in accordance with the SD-WAN rules.

The SD-WAN monitoring system 30 and SD-WAN classifier 32 may route traffic that is high-priority and/or latency sensitive to the secondary connection 14. In some examples, VoIP and video conferencing traffic may be routed over high-quality WAN connections. If the SD-WAN monitoring system 30 detects jitter in the primary connection 12 that exceeds a desired threshold value specified in the SD-WAN rules, the system can automatically transition the VoIP traffic and/or other traffic to the secondary connection 14. Such functionality can help ensure that sensitive traffic like VoIP calls would not be lost and that users would experience less lagging, intelligibility issues, or lost speech during conversations.

In various implementations, if the primary connection 12 is experiencing loss, jitter, latency, and/or other specified triggers the SD-WAN monitoring system 30 automatically transitions the VoIP and/or other sensitive traffic to the failover/backup connection 14. When the primary connection 12 issues are resolved the SD-WAN monitoring system 30 triggers the SD-WAN failover device 34 to transition the traffic back to the primary connection 12.

In some implementations, the transitioning of traffic between the primary connection 12 and the failover connection 14 can be done seamlessly without dropping calls or loss of quality due to the switching. In some implementations the monitoring system 30 triggers the SD-WAN failover device 34 to transition traffic back to the primary connection 12 in stages to prevent the interruption of current traffic. In some cases this strategy includes immediately assigning new session traffic to the primary connection 12 while maintaining existing session traffic on the failover connection 14. As just two of many possible examples, under this connection scheme an end user making a new VoIP call or logging into a remote desktop would be connected over the reestablished and validated primary connection. Conversely, an end user already on a VoIP call or already logged into a remote desktop would continue with the failover connection to avoid service interruptions.

In some implementations, an SD-WAN monitoring system monitors a network and gathers information regarding which connection is being used to send various traffic by tracking the source IP address. This monitoring is alternately described as flow tracking herein. In these implementations, one or more targets, such as a hostname or an IP address, are placed on a server so that when a particular SD-WAN rule is created, one of the targets can be programmed within the SD-WAN rule. As an SD-WAN rule directs traffic, the rule also routes one or more packets to the corresponding target on the server. The server receives the packets and then determines the connection used by the rule to send the traffic based on the source IP address. This data can then be used by the SD-WAN monitoring system and an analytics engine to generate data regarding the network and its performance.

FIGS. 1-2 depict an example that illustrates the SD-WAN monitoring system's ability to determine SD-WAN rule usage and network traffic routing. In the example, the target host name "flow1.host.com" 42 on the server 38 corresponds to an SD-WAN rule "Flow1" related to VoIP traffic. As the SD-WAN rule Flow1 directs VoIP traffic it also sends packet 44 or packet 46 to the target 42 on the server 38 depending on the network connection currently being used. By reviewing the source IP address 48, 49 of the packets 44, 46, the monitoring system 30 (e.g., via the server 38 and/or the analysis engine 40) is able to determine which of the primary or secondary connections is being used to send the VoIP traffic by the Flow1 SD-WAN rule.

As discussed above, in some implementations, the connections 12, 14 can be validated using the probe 18. Referring to FIG. 1, in some cases the probe 18 sends a test packet 90 over the primary connection 12 to the server 38. A second test packet 92 is sent from the probe 18 over the secondary connection 14 to the server 38. The server 38 can then display the connection validation information on a dashboard. If the test packets 90, 92 stop flowing over either connection 12, 14 or other error conditions are encountered (for example, due to network latency, DNS resolution time, HTTPS handshake time, and the like), the server 38 can update the dashboard in real-time or near real-time. The server 38 may additionally notify a user, network administrator, or other service provider of the connection failure or other error condition such that the issue can be promptly resolved.

While FIGS. 1-2 depict one particular implementation of an SD-WAN monitoring system 30 along with corresponding networking devices and functionality, the SD-WAN monitoring system 30 and other components and features discussed above and elsewhere herein can be implemented in a variety of manners as would be understood by those skilled in the art and as further described below.

It should be appreciated that the functionality and features of the disclosed technology can be implemented using multiple configurations of network devices, components, and connections and are not limited to the example illustrated in FIGS. 1-2. For example, FIGS. 1-2 illustrate a primary connection 12 that is a wired connection and a secondary connection 14 that is a wireless connection, but the disclosed technology is not at all limited to this specific connection arrangement. According to implementations, one or both of the primary connection and the secondary connection can be a wired connection, such as a fiber optic cable, a DSL/telephone line or a cable television line, along with any other suitable wired connection that would be recognized by those of skill in the art. Further, one or both of the primary connection and the secondary connection can be a wireless connection. Possible examples of wireless network connections include, but are not limited to, cellular connections (e.g., LTE, 4G, 5G, etc.), Wi-Fi, satellite, and any other suitable analog or digital radio wave technology, as would be appreciated by those skilled in the art.

As depicted in FIG. 2, in various implementations the failover device 16 and/or the SD-WAN failover device 34 are located within or integrated into the firewall 4. In various implementations one or both of these failover devices 16, 34 can be a separate, physical device connected to the firewall 4 through the network 10. In the example of FIGS. 1-2, the SD-WAN monitoring system 30 includes both the automatic connection failover device 16 and the SD-WAN failover device 34 incorporated by the firewall 4. In some implementations the functionality of these two failover devices may be implemented by a single failover device, as will be appreciated by those of skill in the art. Further, in some cases the failover devices 16, 34 are implemented by network traffic rules (e.g., SD-WAN rules) that control the operation of the firewall 4 to route traffic.

In some implementations the SD-WAN classifier 32 is defined at least in part by the SD-WAN rules. In the example of FIG. 2, the SD-WAN classifier 32 is implemented by and integral with the firewall, though the SD-WAN classifier 32 may be implemented by separate processing hardware in various other implementations. Further, it is understood that in certain implementations, the firewall 4 may be integrated into a single unit with a modem. In some cases, though, one or more modems may be stand-along devices connected to the network 10.

Referring to the probe 18 illustrated in FIGS. 1-2, in the depicted implementation the probe 18 is a separate network device apart from the firewall 4. As an example, the probe 18 can be constructed and arranged along the lines of the network probes taught by U.S. Pat. No. 10,616,347. The probe network connection 100 is a wired connection in this example (e.g., an ethernet, power line, or other suitable wired connection), though wireless connections may also be implemented as will be understood by those skilled in the art. In certain implementations, the probe 18 is able to enable, disable, or otherwise initiate and configure SD-WAN classifier 32 rules for all or some protocols, applications, and/or domains in order to flow corresponding network traffic over the primary connection 12, the secondary connection 14, or another connection.

As depicted in FIGS. 1-2, it will be understood that at least some or all of the probe logic exists on the probe 18 itself. In some cases, though, the probe logic may be implemented by another network device connected to firewall either through the LAN or otherwise. Further, although not depicted in FIG. 1 or FIG. 2, in some cases the probe 18 is implemented as an integral portion of another networking component. For example, the probe can be implemented by hardware integrated within another device and/or may include software running, for example, on a client computer or other device on the LAN 2 or the server 38, analytics engine 40 or other device external to the LAN 2. In further implementations, targeted packets can be dispatched from a router, firewall or other networked component configured to dispatch such packets to the cloud for monitoring and analysis. In some implementations the probe 18 is an "internet of things" appliance installed in the network 10 and downstream of, or otherwise in electronic communications with, the internet connections 12, 14.

In some implementations an SD-WAN monitoring system can include one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions such as via local probe hardware, desktop, server client, phone app or other software or hardware running software that can be used to perform connection monitoring, analysis, and/one or more other features and functions disclosed herein. In some cases instructions for configuring and operating one or more network devices are stored as computer programs or software on computer storage devices, such as non-transitory computer readable media.

According to some implementations, the server 38 is configured for collection and analysis of data packets sent by a portion of the SD-WAN monitoring system. The server 38 is connected to a database, which in some cases may be integral with the server 38 or part of the analytics engine 40. The server 38 and analytics engine 40 can further be connected to various networked components known in the art and understood to enable the systems and methods disclosed herein.

In one implementation, one or more client machines on the LAN 2, the probe 18, the server 38, a database, and/or the analytics engine (also represented generally at 40) comprises a central processing unit ("CPU") and main memory, an input/output interface for communicating with various databases, files, programs, and networks (such as the internet, for example), and one or more storage devices. The storage devices may be disk drive devices, CD ROM devices, solid state media or elsewhere in the cloud. The server may also have an interface, including, for example, a monitor or other screen device and an input device, such as a keyboard, a mouse, a touchpad, or any other such known input device. The server in various implementations can have a database that is integral to a processor or accessible to the processor through a computer network or other suitable communication link. In one embodiment, the database is comprised of a plurality of database servers, some or all of which can be integral to the central processor or alternatively can be physically separate from the processor.

In addition, in some cases the disclosed technology can be implemented by and include a variety of other network devices and arrangements and configurations, including various devices and configurations/arrangements for devices and networks disclosed in U.S. Pat. No. 10,616,347, the content of which is hereby incorporated herein by reference.

Figure 3:
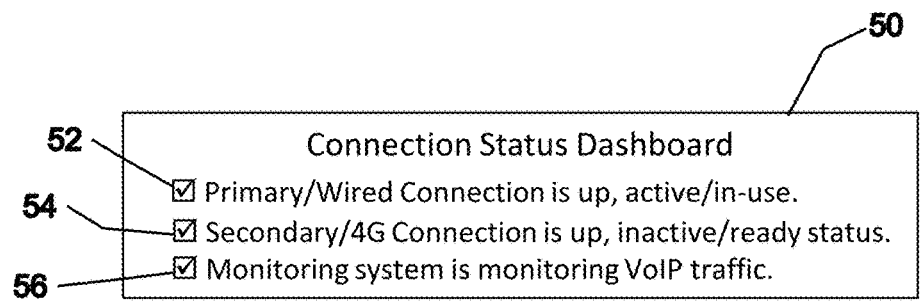
FIG. 3 depicts a dashboard according to one implementation.

As discussed above, in various additional implementations, the data analysis can be displayed, such as on a dashboard. According to various implementations, the dashboard can be generated and displayed on a digital display such as a computer monitor, a television, a smartphone display, a tablet display, or using any other suitable technology for display digital information. In some cases the dashboard may be generated by the server 38 or by a client machine or other device connected to the LAN 2 or otherwise in communication with the SD-WAN monitoring system. An exemplary dashboard 50 is shown in FIG. 3. In this example, the dashboard 50 provides a visual indication of the status of a primary connection 52 and a secondary connection 54. The dashboard 50 also includes an indicator that informs a user whether the SD-WAN monitoring system is monitoring a particular SD-WAN rule. In this example the dashboard 50 displays whether the monitoring system is currently monitoring a VoIP SD-WAN rule 56. According to various implementations, the monitoring system can determine whether or not a particular SD-WAN rule is active by determining the presence or absence of test packets associated with the SD-WAN rule as described above.

Figure 4:
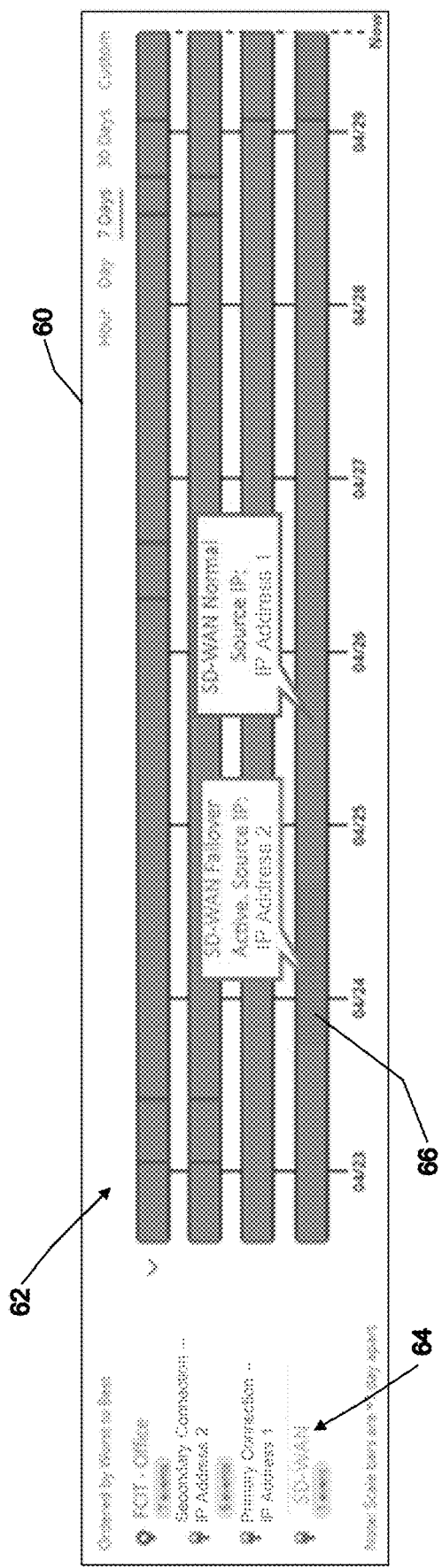
FIG. 4 depicts another dashboard according to one implementation.

FIG. 4 illustrates another example of a dashboard 60 according to various implementations. The dashboard 60 in this example displays a visual timeline 62 for each connection being monitored by the system, including a primary connection and a secondary connection. During operation, the SD-WAN monitoring system monitors the status or use of an SD-WAN rule 64. By determining the source IP address for traffic associated with the rule 64, the monitoring system can determine whether the rule 64 is directing traffic along the primary or secondary internet connections. Use of the secondary connection is indicated by a visually distinctive graphic 66 (e.g., a different color or pattern or graphic) along the timeline 62 corresponding to the time when the secondary connection was active.

Figure 5:
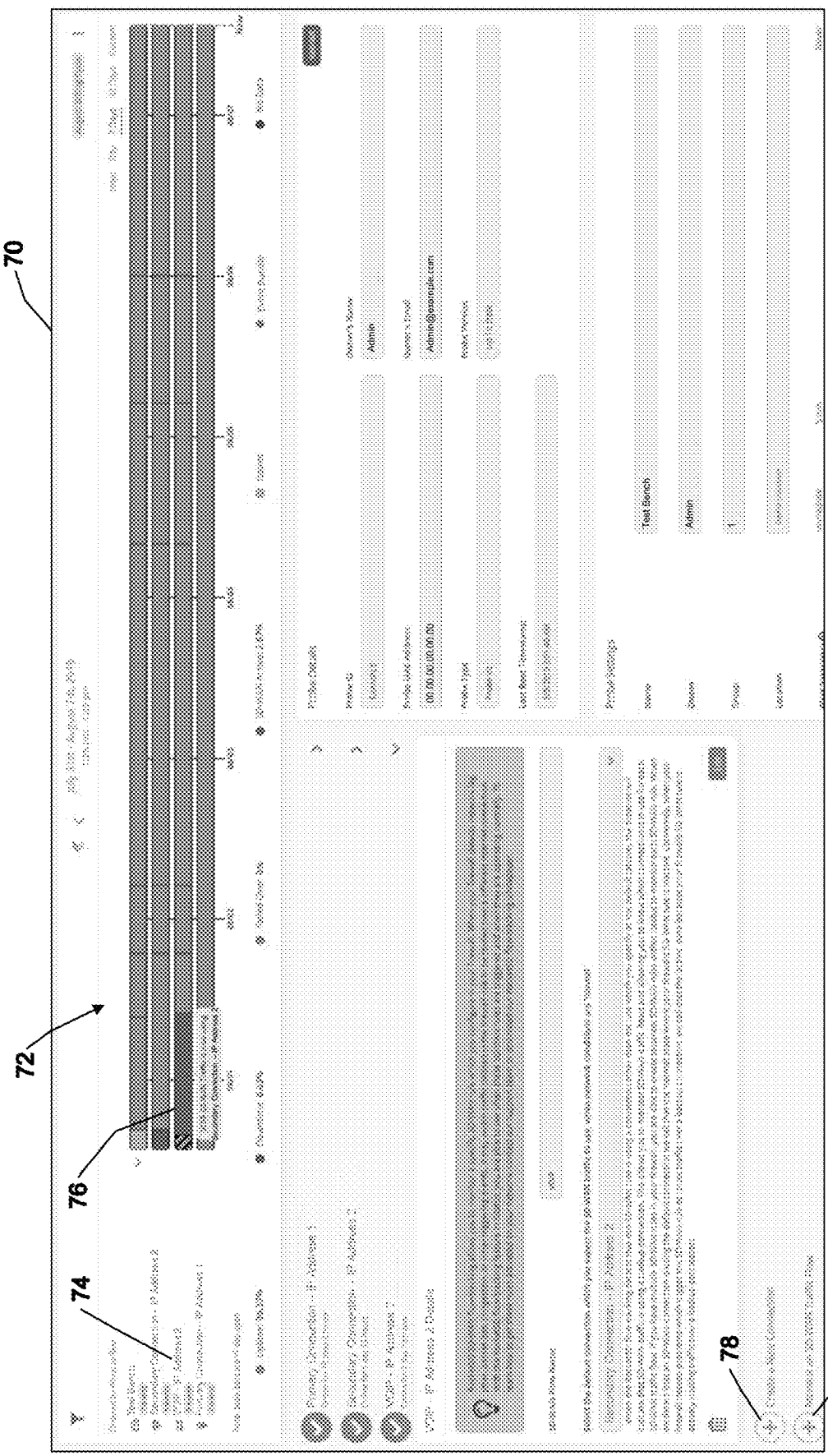
FIG. 5 depicts another dashboard according to one implementation.

FIG. 5 illustrates a view of another dashboard 70 according to various implementations. The dashboard 70 displays a visual timeline 72 for each connection being monitored by the system. In this example the SD-WAN monitoring system is shown monitoring the status of a SD-WAN VOIP rule 74. Use of a secondary connection, as determined by the SD-WAN monitoring system, is depicted 76 along the timeline at the time when the secondary connection was active. In various implementations a dashboard may display additional relevant information and optionally allow users to configure the SD-WAN monitoring system. In the example shown in FIG. 5, the dashboard 70 includes a New Connection control 78 which allows an end user to configure the monitoring system to monitor an additional internet connection. The dashboard 70 also includes an SD-WAN control 80 which allows an end user to configure the monitoring system to monitor the activity of one or more SD-WAN rules.

Some implementations of an SD-WAN monitoring system include a control module or controller that is configured and arranged to create, configure, modify, and/or remove SD-WAN rules from the system in an ongoing basis. In some cases the controller is configured to learn existing SD-WAN rules, monitor network traffic, and then automatically adjust the SD-WAN rules as needed to improve the performance of the system. For example, in some implementations the controller can incorporate artificial intelligence (AI) or machine learning techniques. As such, in some cases the control module or controller is also referred to herein as an AI control module or an AI controller. These techniques can generate quality of service based SD-WAN classifiers and rules in an ongoing fashion, such that the system according to these implementations is configured to retrieve or generate appropriate unique or semi-unique sub-domains, for example all traffic for all customers to a specific API endpoint, automatically. In such cases the server can map those to the submitted SD-WAN flow rule (e.g., from a probe or from a module on the firewall/router that is doing the SD-WAN routing/classifying), then the server can respond that the rule the client submitted is mapped to a specific subdomain. The system or user can then modify the SD-WAN rules that were generated or pre-configured in some templates to have the "AND" condition to also match the routable hostname that allows the system to perform the monitoring.

Figure 6:
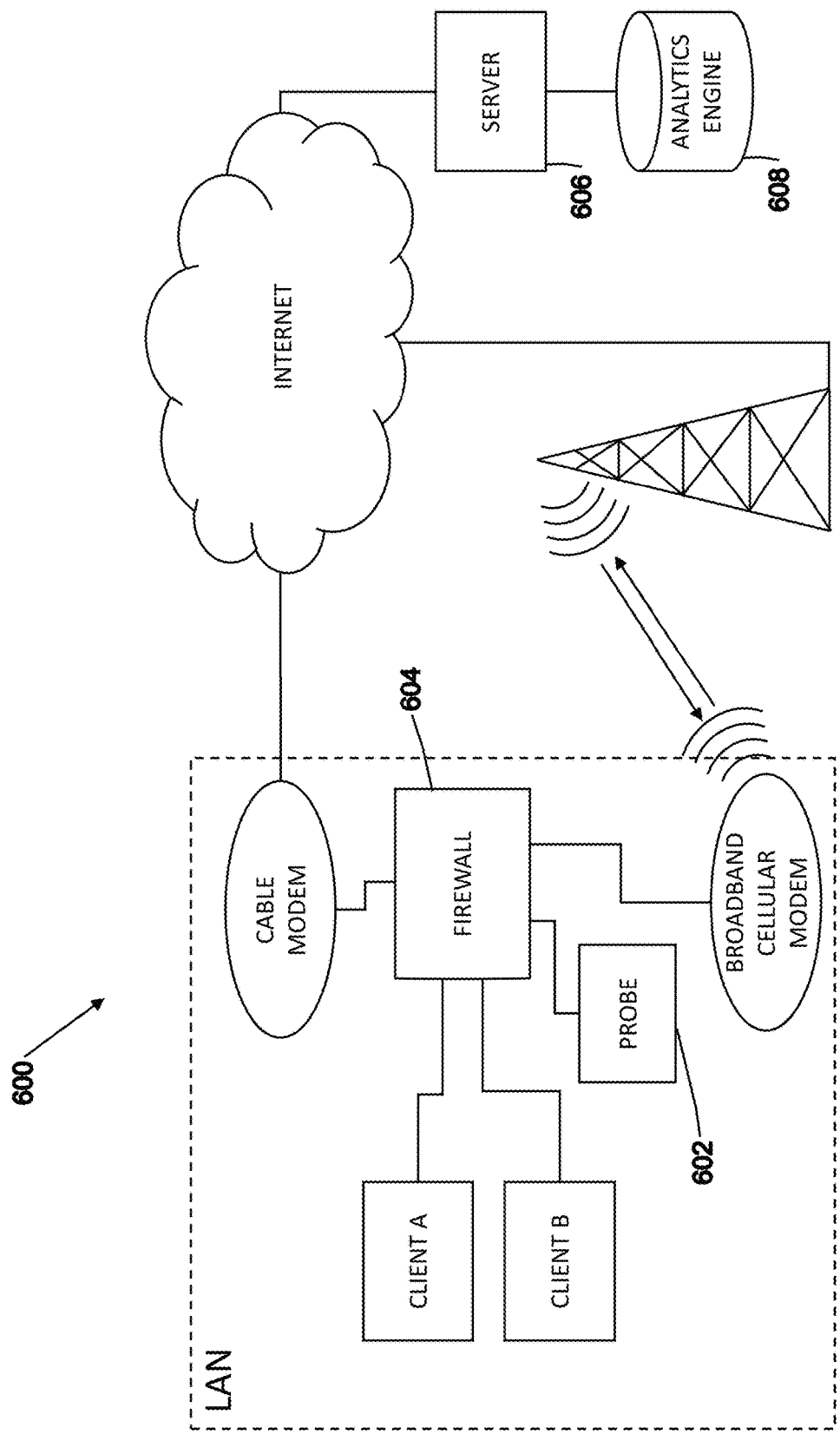
FIGS. 6-8 are partial schematic representations of an SD-WAN monitoring system according to various implementations.
Figure 7:
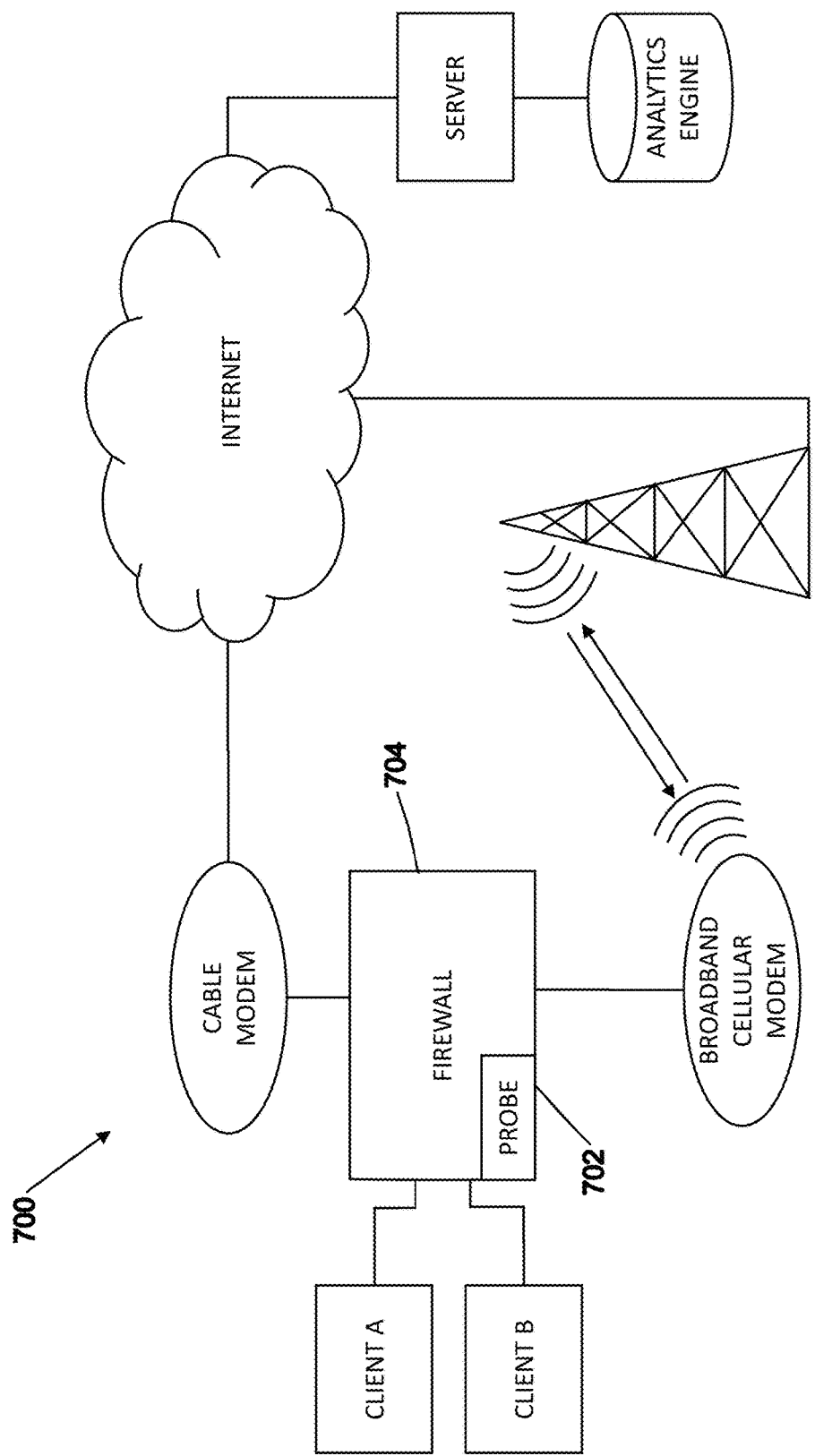
Figure 8:
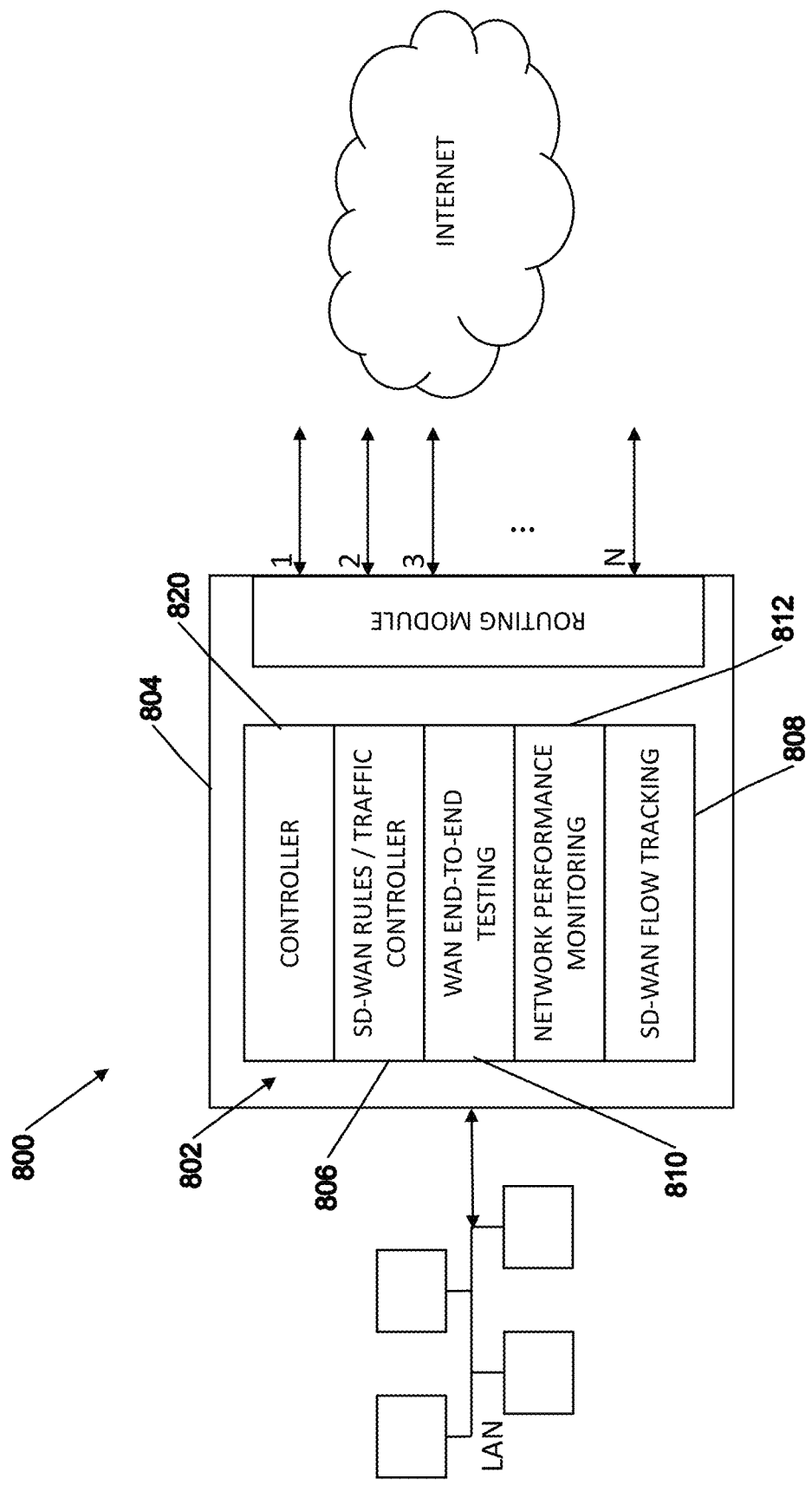

FIGS. 6-8 are partial schematic representations of an SD-WAN monitoring system according to various implementations. According to various implementations, the depicted SD-WAN monitoring systems may in some cases include an AI or machine learning controller as discussed above. Turning to FIG. 6, in some implementations an SD-WAN monitoring system 600 constructed and arranged to monitor and configure the use of SD-WAN rules and the routing of network traffic from LAN clients to the internet over a cable modem connection and a broadband cellular modem connection. In this example the SD-WAN monitoring system 600 includes a probe 602 along with a firewall 604 and a cloud-based server 606 and analytics engine 608, though other arrangements are possible as those skilled in the art will appreciate. FIG. 7 illustrates an example of an SD-WAN monitoring system 700 similar in some respects to the system 600 shown in FIG. 6. In this implementation, the SD-WAN monitoring system 700 includes a probe 702 that is formed as a part of a firewall 704. For example, the probe may be an integral module operating within the firewall itself or may be a discrete component or chip housed along with the firewall 704.

Turning to FIG. 8, in some implementations an SD-WAN monitoring system 800 includes a probe 802 that is an integrated with a firewall 804. For example, the probe 802 may be an integral module operating within the firewall 804 itself or may be a discrete component or chip located within the firewall's housing. The firewall 804 includes a routing module configured to connect to multiple internet connections 1-N, which may be various wired and wireless types of connections. The firewall is further configured to connect with one or more clients on a LAN.

In the implementation depicted in FIG. 8, the probe 802 includes multiple functional modules that implement the functionality of the SD-WAN monitoring system 800. As shown, the probe includes an SD-WAN rules/trafficker controller or classifier 806 that stores and implements the system's SD-WAN rules. Also included is an SD-WAN flow tracking module 808 that is configured to route packets associated with various SD-WAN rules to a cloud-based server to determine how the SD-WAN rules are routing traffic over multiple internet connections 1-N. The probe 802 further includes a WAN end-to-end testing module 810 and a network performance monitoring module 812 that are configured to monitor and determine the status and performance of the various network connections 1-N.

In some implementations the probe 800 further includes a controller 820 configured and arranged to monitor the network connections 1-N. The controller 820 is further configured to interact with the probe's other modules to manage system performance. For example, in some cases the controller 820 is configured to monitor and analyze data from the end-to-end testing module 810 and the network performance module 812. Based on these data inputs, the controller 820 may automatically generate new or modify existing SD-WAN rules to better handle network traffic (e.g., with less latency, jitter, lapse). In some cases the controller 820 may automatically apply various SD-WAN flow tracking to implement perceived opportunities for performance gains.

In various implementations, an SD-WAN monitoring system can be configured and arranged to determine which SD-WAN rules are operating, to monitor the performance of various connections and SD-WAN rules, including detecting the flow of network traffic among various routes, and to automatically make changes to the monitoring system and the definitions and use of SD-WAN rules. In some cases an SD-WAN monitoring system may be configured to:

Correlate events across multiple NPM targets combined with ISP data to determine the best WAN paths to the cloud-hosted services.
Combine connection quality data with NPM data and SD-WAN flow tracking data.
Use big data, automated testing, and knowledge to make decisions about how to control or manage the network.
Detect trends that are difficult to notice otherwise. For example, a network management system may not ordinarily notice if the network repeatedly crashes every 37.2 hours. In addition, it may not be obvious that traffic to certain sets of Internet targets is always slow, or that congestion to groups of targets occurs frequently.
Detect issues that are not visible from a single location. For example, determining that all customers of a particular ISP are offline in a given city can direct the activities of an IT team in the event of a connection failure.
Fix problems automatically; control power, issue commands via SSH/Telnet/SNMP and other protocols.
Send alerts. In some cases an SD-WAN monitoring system with an AI controller can fine tune the language of notices to match circumstances on the ground. In some cases the system could suppress network alarms/emails when it determines that network bounces occur outside business hours (when ISP's typically do maintenance). This approach advantageously reduces the number of unnecessary emails sent to the IT Team.
Automate mundane tasks.
Upon detecting a network failure, determine whether the probe was reset simultaneously and potentially differentiate between a network failure and a power outage.
Issue commands to control the flow of traffic to firewalls or other network devices.
Issue notifications for other systems to take action (e.g., If-This-Then-That).

In various implementations, the SD-WAN monitoring system may be configured to process information from various inputs in real-time, or in near real-time. Processing input information in this way can enable real-time generation and modification of SD-WAN rules to better handle network traffic under the current circumstances. Multiple examples of analyzing various data to make ongoing changes to SD-WAN rules will now be discussed.

According to various implementations, a probe within an SD-WAN monitoring system may be capable of issuing commands to devices on the network such as a firewall, a network switch (e.g., via Simple Network Management Protocol or SNMP), or a smart power strip. In one example a probe is configured to detect quality of service issues such as, for example, latency, jitter, intermittent or sustained packet loss, and/or intermittent or sustained network congestion, via a primary WAN connection to a VoIP provider. The probe can be configured to quickly evaluate the same route on another connection or simply generate an SD-WAN rule to re-route traffic over a different WAN connection. After, or in parallel to, the creation of the generated SD-WAN rule, the probe could communicate with a cloud server to create or retrieve an appropriate unique or semi-unique sub-domain that could be added to the SD-WAN rule to thus enable flow tracking. In this scenario, the generated SD-WAN rule can be made visible to end-users on a cloud server dashboard. The dashboard could show when the rule was created, which traffic it is routing to which WAN connection, and allow users to keep or modify this rule. In some cases the probe may be capable of issuing commands to the firewall to create, enumerate, edit, and delete SD-WAN rules or other routing rules that direct the flow of traffic.

In further implementations, a controller implementing AI or applied machine learning from training based on large data sets may be located on-site or on a server in the cloud.

One would appreciate the advantages of having AI co-located on-premise when the internet is down or experiencing issues. In such cases the controller can create rules to direct the flow of internet-bound traffic from the LAN.

In further implementations, an AI controller may be integrated into a combination of hardware and software modules on a firewall, network security gateway, router, or other edge network appliances as appropriate.

According to some implementations, an SD-WAN system with an AI controller may be beneficial for retrofitting older networking equipment instead of replacing it with newer hardware. In some cases an SD-WAN monitoring system combined with AI controller modules based on a cloud server may allow for the cloud server to analyze conditions and issue commands to a probe on the LAN to then issue commands to network devices.

In some cases it is contemplated that a probe or cloud server within an SD-WAN monitoring system has an API integration with an internet service provider (ISP) such that it's possible to ask the ISP if it is having an outage, via a non-ISP connection, if the ISP's connection is offline. In such scenarios, SD-WAN rules could be automatically generated to steer critical applications and network traffic over to a tertiary internet connection prioritized for low latency. It may be beneficial to steer some traffic to the cheapest price per GB to reduce operational costs.

In another example, automatically generated SD-WAN rules could be configured such that if the probe or cloud server asks the local power company API if they're having an outage and what the geography is that's affected, the location could re-route telecommunications or other internet-destined and important traffic to a satellite connection. If this was at a datacenter, the probe could issue commands to turn on a diesel generator to keep the location online or issue commands to a robot to attempt to replace defective equipment that is interrupting the primary network connectivity. When the primary network connection is back online, the probe can verify the online status and perform a gradual failback to the primary connection while decommissioning the SD-WAN rule.

In certain embodiments, it can be appreciated that logging data or infrastructure information could be sent to or retrieved from other systems such as security information and event management (SIEM), or categorized or organized into a status report sent to humans for post-analysis of the network failure event.

One frequent issue most enterprise experience is that network maintenance needs to be performed by an ISP. In the above example where the probe is communicating with an ISP, the probe or cloud server may be configured to communicate via some API to establish a timeframe and status updates for planned network outage and/or maintenance activities. Before these planned events, the probe's AI controller can issue commands to generate SD-WAN rules and move all important traffic over to other WAN connections ahead of the planned outage time window. Upon completing work, machine to machine API communications could result in the probe verifying and validating that the respective connection is back online before removing the generated SD-WAN traffic rules and thus moving the location's traffic back over to the connection that had maintenance performed.

Those skilled in the art will recognize that there are several issues related to Border Gateway Protocol (BGP) that could result in DNS failures simultaneously with ISP connectivity issues. In some cases an AI controller located on a probe or in a cloud server may be configured to determine that DNS resolution from specific providers is no longer working. In this case the probe may report this information to the cloud server, and the server may conduct an analysis to see if other locations that use the same DNS server are experiencing issues. If multiple locations experience the issue, the cloud server may inform the probe, which could be configured to create firewall rules to redirect DNS requests or simply change the issued DNS for clients on the network. If required, the probe may create SD-WAN rules to direct traffic to flow over another WAN connection that may not be experiencing issues related to the DNS issue.

In further implementations, an AI controller within a probe or on a cloud server communicating with a probe may be configured to continuously measure the connectivity performance and quality of important domains, APIs, and other cloud services that a business would interact with. This network performance information can be combined with geolocation data or internet topology information such as BGP peering information to determine if an issue is happening concerning a specific area or a specific ISP within an area. In certain implementations, the probe could ask the firewall for a list of the top domains that a location is connecting to. In other implementations, a cloud server could communicate via API with a firewall vendor API to retrieve information about the top domains in use. The continual analysis of this WAN destination information is largely mundane and information-dense which lends itself to be analyzed in an automated way to detect issues such as slow degradation, intermittent performance impacts, or trends that otherwise occur on a time-frequency basis. The net result of using an AI controller on-site (e.g., within a probe) or in a cloud server analyzing this information is that a probe can thus issue commands to devices to resolve these network issues. For example, the AI controller may create SD-WAN rules to steer traffic or send an API request to an ISP's support ticket platform or an internal IT support ticketing platform or STEM.

As discussed above, various implementations of an SD-WAN monitoring system are configured to monitor how SD-WAN rules are directing network traffic over one or more internet connections. This monitoring of SD-WAN traffic flows is also referred to herein as "flow tracking." FIGS. 9-12, which will now be discussed, are sequence diagrams that illustrate various aspects of the SD-WAN monitoring or flow tracking technology discussed herein.

Figure 9:
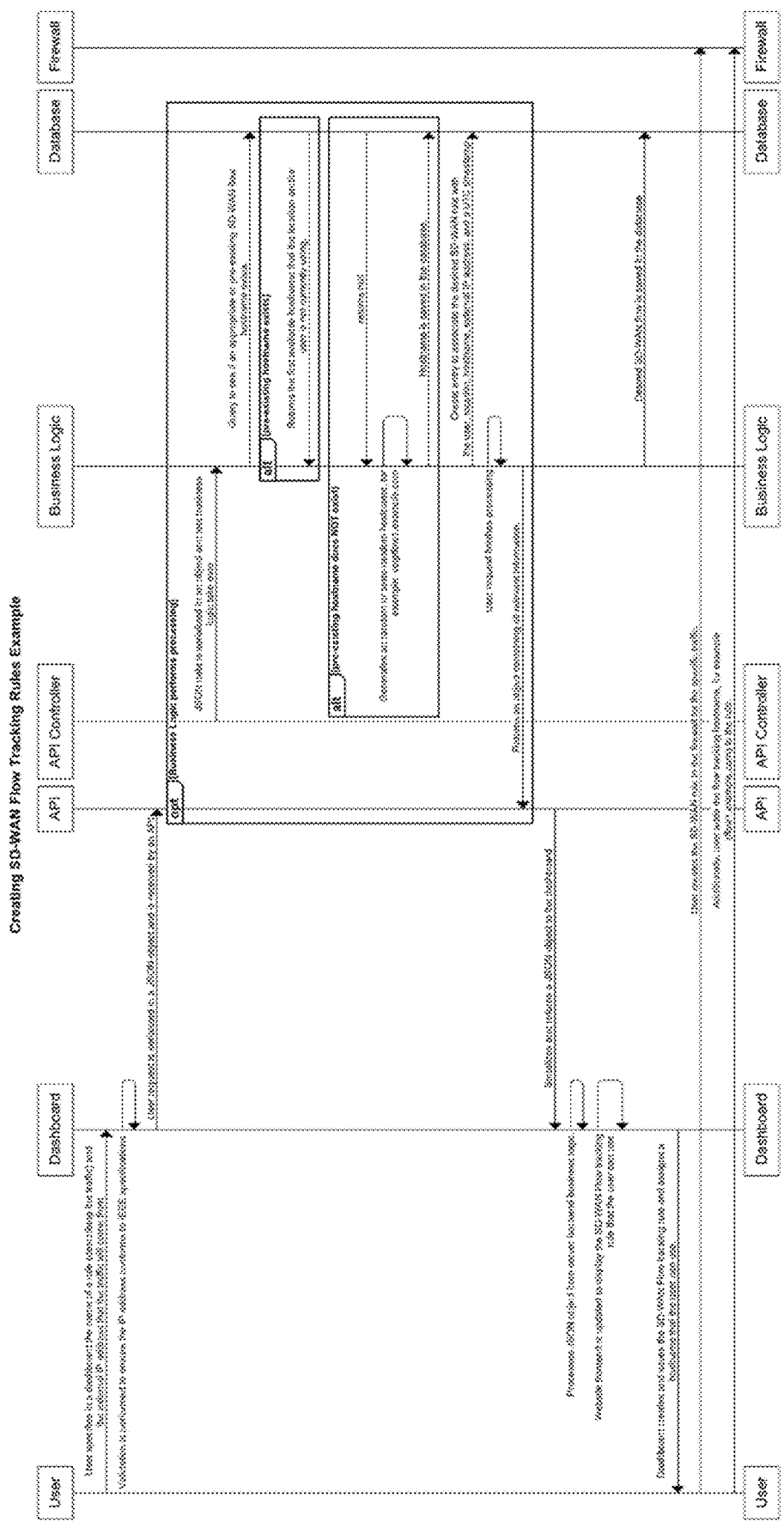
FIG. 9 is a sequence diagram for creating SD-WAN flow tracking rules according to one implementation.

FIG. 9 is a sequence diagram for creating SD-WAN flow tracking rules according to one implementation. It should be appreciated that the depicted sequence is only one possible example for creating SD-WAN flow tracking rules and that many variations and other examples are contemplate as would be understood by those skilled in the art. As shown in FIG. 9, this example method for creating SD-WAN flow tracking rules includes:

User→Dashboard: User specifies in a dashboard the name of a rule (describing the traffic) and the external IP address that the traffic will come from.
Dashboard→Dashboard: Validation is performed to ensure the IP address conforms to IEEE specifications.
Dashboard→API:User request is serialized to a JSON object and is received by an API
  Opt Business Logic performs processing
    API Controller→Business Logic: JSON data is serialized to an object and lets business logic take over
    Business Logic→Database: Query to see if an appropriate or pre-existing SD-WAN flow hostname exists.

alt pre-existing hostname exists
    Database→Business Logic: Returns the first available hostname that the location and/or user is not currently using.
end
alt pre-existing hostname does NOT exist
    Database→Business Logic: returns null
    Business Logic→Business Logic: Generates an random or semi-random hostname, for example: voipflow1.example.com
    Business Logic→Database: Hostname is saved in the database.
end
Business Logic→Database: Create entry to associate the desired SD-WAN rule with the user, location, hostname, external IP address, and a UTC timestamp
Business Logic→Business Logic: User request finishes processing
Business Logic→API: Returns an object containing all relevant information.
end
API→Dashboard: Serializes and returns a JSON object to the dashboard
Dashboard→Dashboard:Processes JSON object from server backend business logic.
Dashboard→Dashboard:Website frontend is updated to display the SD-WAN Flow tracking rule that the user can use.
Business Logic→Database: Desired SD-WAN flow is saved to the database
Dashboard→User: Dashboard creates and saves the SD-WAN Flow tracking rule and assigns a hostname that the user can use.
User→Firewall: User creates the SD-WAN rule in the firewall for the specific traffic.
User→Firewall: Additionally, user adds the flow tracking hostname, for example (flow1.example.com) to the rule.

Figure 10:
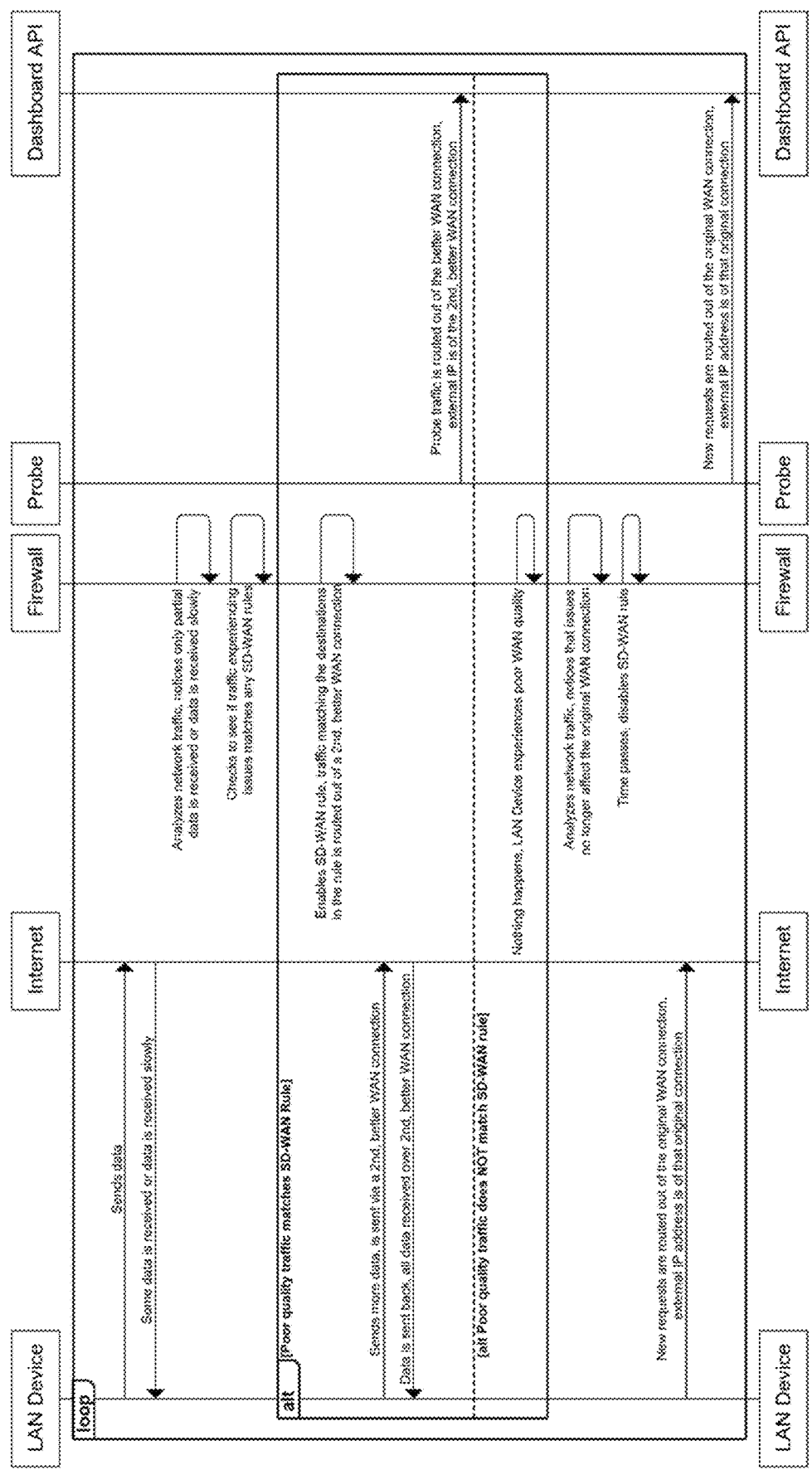
FIGS. 10 and 11 are sequence diagrams illustrating how SD-WAN flow tracking takes place according to one implementation.
Figure 11:
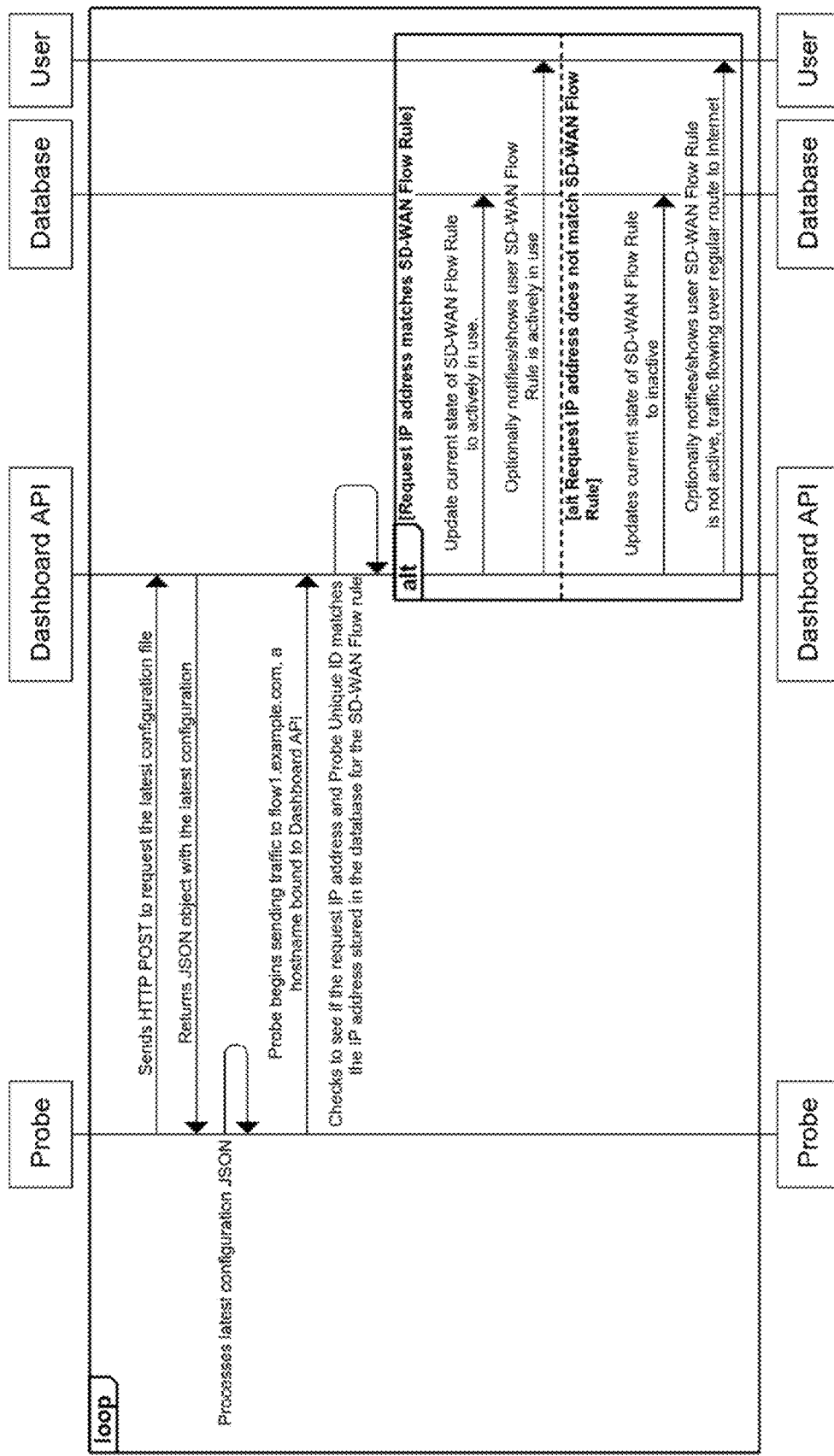

FIGS. 10 and 11 are sequence diagrams illustrating how SD-WAN flow tracking takes place according to one implementation. FIG. 10 illustrates one example of how a LAN works and FIG. 11 illustrates one example of how flow tracking works. Various aspects of the sequences in FIGS. 10 and 11 may in some cases be performed sequentially or in parallel in some cases. It should be appreciated that the depicted sequences are only one possible example for how SD-WAN flow tracking takes place and that many variations and other examples are contemplate as would be understood by those skilled in the art.

Figure 12:
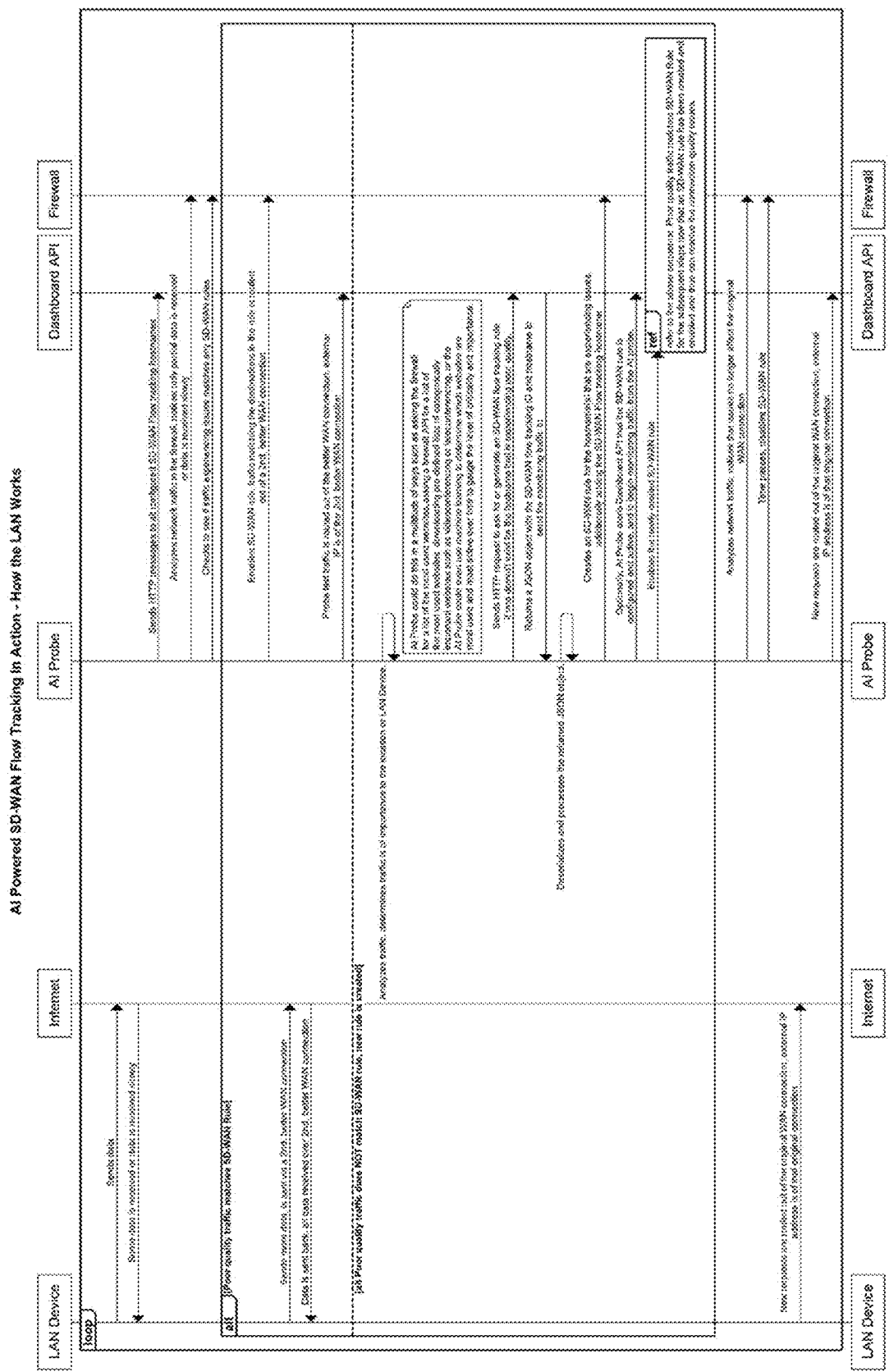
FIG. 12 is a sequence diagram illustrating how a probe with an AI controller can generate SD-WAN flow tracking rules and SD-WAN rules according to one implementation.

The sequence shown in FIG. 10 includes:
loop
    LAN Device→Internet: Sends data
    Internet→LAN Device: Some data is received or data is received slowly
    Firewall→Firewall: Analyzes network traffic, notices only partial data is received or data is received slowly
    Firewall→Firewall: Checks to see if traffic experiencing issues matches any SD-WAN rules
    alt Poor quality traffic matches SD-WAN Rule
        Firewall→Firewall: Enables SD-WAN rule, traffic matching the destinations in the rule is routed out of a 2nd, better WAN connection
        LAN Device→Internet: Sends more data, is sent via a 2nd, better WAN connection
        Internet→LAN Device: Data is sent back, all data received over 2nd, better WAN connection
        Probe→Dashboard API: Probe traffic is routed out of the better WAN connection, external IP is of the 2nd, better WAN connection
    else alt Poor quality traffic does NOT match SD-WAN rule
        Firewall→Firewall: Nothing happens, LAN Device experiences poor WAN quality
    end
    Firewall→Firewall: Analyzes network traffic, notices that issues no longer affect the original WAN connection
    Firewall→Firewall: Time passes, disables SD-WAN rule
    LAN Device→Internet: New requests are routed out of the original WAN connection, external IP address is of that original connection
    Probe→Dashboard API: New requests are routed out of the original WAN connection, external IP address is of that original connection
end The sequence shown in FIG. 11 includes:
loop
    Probe→Dashboard API: Sends HTTP POST to request the latest configuration file
    Dashboard API→Probe: Returns JSON object with the latest configuration
    Probe→Probe: Processes latest configuration JSON
    Probe→Dashboard API: Probe begins sending traffic to flow1.example.com, a hostname bound to Dashboard API
    Dashboard API→Dashboard API: Checks to see if the request IP address and Probe Unique ID matches the IP address stored in the database for the SD-WAN Flow rule
    alt Request IP address matches SD-WAN Flow Rule
        Dashboard API→Database: Update current state of SD-WAN Flow Rule to actively in use.
        Dashboard API→User: Optionally notifies/shows user SD-WAN Flow Rule is actively in use
    else alt Request IP address does not match SD-WAN Flow Rule
        Dashboard API→Database: Updates current state of SD-WAN Flow Rule to inactive
        Dashboard API→User: Optionally notifies/shows user SD-WAN Flow Rule is not active, traffic flowing over regular route to Internet
    end
end FIG. 12 is a sequence diagram illustrating one possible example for how a probe with an AI controller can generate SD-WAN flow tracking rules and SD-WAN rules on the fly to resolve issues. It should be appreciated that the depicted sequence is only one possible example for how a probe with an AI controller can generate SD-WAN flow tracking rules and SD-WAN rules and that many variations and other examples are contemplate as would be understood by those skilled in the art.

The sequence shown in FIG. 12 includes:
loop
    LAN Device→Internet: Sends data
    Internet→LAN Device: Some data is received or data is received slowly
    AI Probe→Dashboard API: Sends HTTP messages to all configured SD-WAN Flow tracking hostnames AI Probe→Firewall: Analyzes network traffic in the firewall, notices only partial data is received or data is received slowly AI Probe→Firewall: Checks to see if traffic experiencing issues matches any SD-WAN rules alt Poor quality traffic matches SD-WAN Rule AI Probe→Firewall: Enables SD-WAN rule, traffic matching the destinations in the rule is routed out of a 2nd, better WAN connection LAN Device→Internet: Sends more data, is sent via a 2nd, better WAN connection Internet→LAN Device: Data is sent back, all data received over 2nd, better WAN connection AI Probe→Dashboard API: Probe test traffic is routed out of the better WAN connection, external IP is of the 2nd, better WAN connection else alt Poor quality traffic does NOT match SD-WAN rule, new rule is created AI Probe→AI Probe: Analyzes traffic, determines traffic is of importance to the location or LAN Device.

note right of AI Probe

AI Probe could do this in a multitude of ways such as asking the firewall for a list of the most used websites, asking a firewall API for a list of the most used websites, downloading pre-defined lists of categorically important websites such as videoconferencing or teleconferencing, or the AI Probe could even use machine learning to determine which websites are most used and most active over time to gauge the level of criticality and importance.

end note

AI Probe→Dashboard API: Sends HTTP request to ask for or generate an SD-WAN flow tracking rule if one doesn't exist for the hostname that is experiencing poor quality.

Dashboard API→AI Probe: Returns a JSON object with the SD-WAN flow tracking ID and hostname to send the monitoring traffic to.

AI Probe→AI Probe: Deserializes and processes the returned JSON object.

AI Probe→Firewall: Creates an SD-WAN rule for the hostname(s) that are experiencing issues, additionally adding the SD-WAN Flow tracking hostname.

AI Probe→Dashboard API: Optionally, AI Probe alerts Dashboard API that the SD-WAN rule is configured and active, and to begin monitoring traffic from the AI probe.

AI Probe→ref over Firewall: Enables the newly created SD-WAN rule refer to the above sequence: Poor quality traffic matches SD-WAN Rule for the subsequent steps now that an SD-WAN rule has been created and enabled and thus can resolve the connection quality issues.

end ref end

AI Probe→Firewall: Analyzes network traffic, notices that issues no longer affect the original WAN connection AI Probe→Firewall: Time passes, disables SD-WAN rule LAN Device→Internet: New requests are routed out of the original WAN connection, external IP address is of that original connection AI Probe→Dashboard API: New requests are routed out of the original WAN connection, external IP address is of that original connection end As discussed herein, in some implementations the SD-WAN monitoring system includes an AI controller that is configured and arranged to monitor network performance and manage SD-WAN rules in an ongoing basis. According to some implementations, an SD-WAN monitoring system with an AI controller can be used in conjunction with NPM (network performance monitoring), validating a connection, detecting congestion, and/or SD-WAN flow tracking.

As used herein, "validating a connection" refers to the ability to monitor traffic-flows from different devices. The use-case of a business who is using a cloud-based VoIP (telephone) platform is informative. In normal circumstances the VoIP traffic uses the primary internet connection for the business, but whenever the Internet Service Provider has congestion (e.g., latency, loss or jitter) issues, the SD-WAN monitoring system is configured to switch this time-sensitive traffic to a secondary connection as discussed elsewhere herein. Although network traffic may be successfully switched to a secondary connection, it can still be challenging to understand when traffic is flowing from the primary connection, or when the SD-WAN rules are active, and therefore traffic is being directed (or steered) out to the internet via the backup or secondary connection (e.g., a 4G/5G connection).

As discussed herein, implementations of SD-WAN monitoring system can create a traffic classifier that will match the VoIP traffic, and which will also match traffic sent to a specific IP address which the system uses to monitor traffic flows. By generating test packets (e.g., pulses), and correlating these packets in, for example, a cloud based server, the monitoring system can then determine when these packets are flowing from the primary connection or when the SD-WAN traffic steering is occurring and this traffic is being sent via the secondary connection.

According to various implementations, the primary and/or the second internet connections are any one or more of broadband cellular (e.g., 4G/5G) connections, normal broadband, satellite, DSL, wireless or any other connectivity. It should be appreciated that the disclosed SD-WAN monitoring/flow tracking technology disclosed herein is hardware agnostic and does not require any proprietary implementation on the firewall/router other than the installation of a policy route and a rule to classify the traffic. Accordingly, the disclosed technology can be implemented in networks having a wide variety of hardware devices and types of internet connections.

Example 1: AI Controller with NPM, Validating a Connection, and SD-Wan Flow Tracking According to some implementations, an SD-WAN monitoring system includes an AI controller along with the capability for network performance monitoring, validating a connection, and SD-WAN flow tracking. This enables the system to know when a connection failover or SD-WAN traffic steering event is happening. The AI controller can then correlate potential failures in NPM targets which occur during those intervals, with a failover or SD-WAN event. This ability enables the monitoring system to determine if anything critical is broken during (potentially rare) intervals where the primary connection has failed completely, or during intervals where the primary connection is congested and when SD-WAN traffic steering rules are active. The monitoring system can then report the problem or take alternate actions to automatically remediate the issue.

Figure 13:
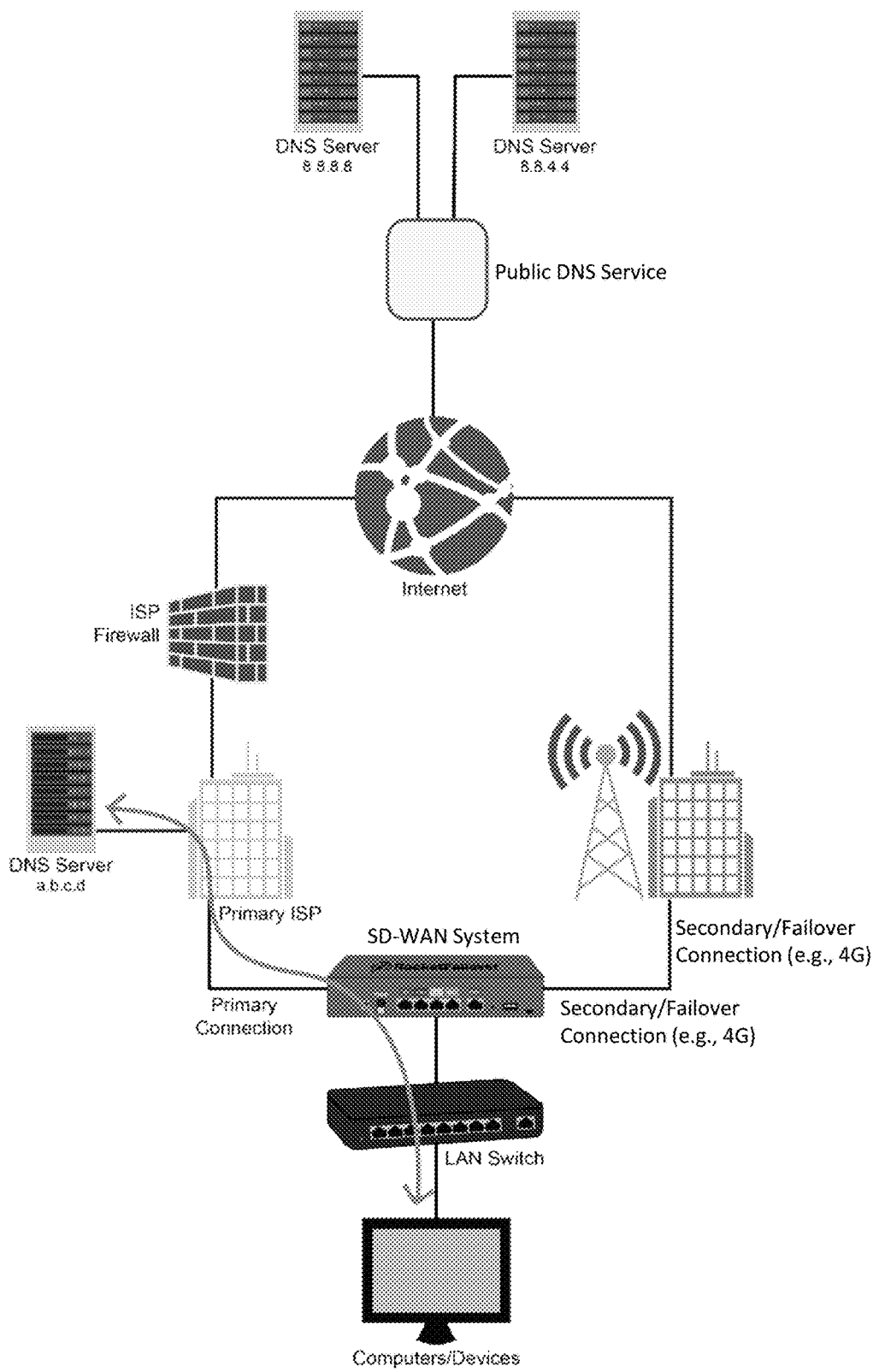
FIGS. 13-16 are schematic network diagrams illustrating use of an SD-WAN monitoring system according to one implementation.
Figure 14:
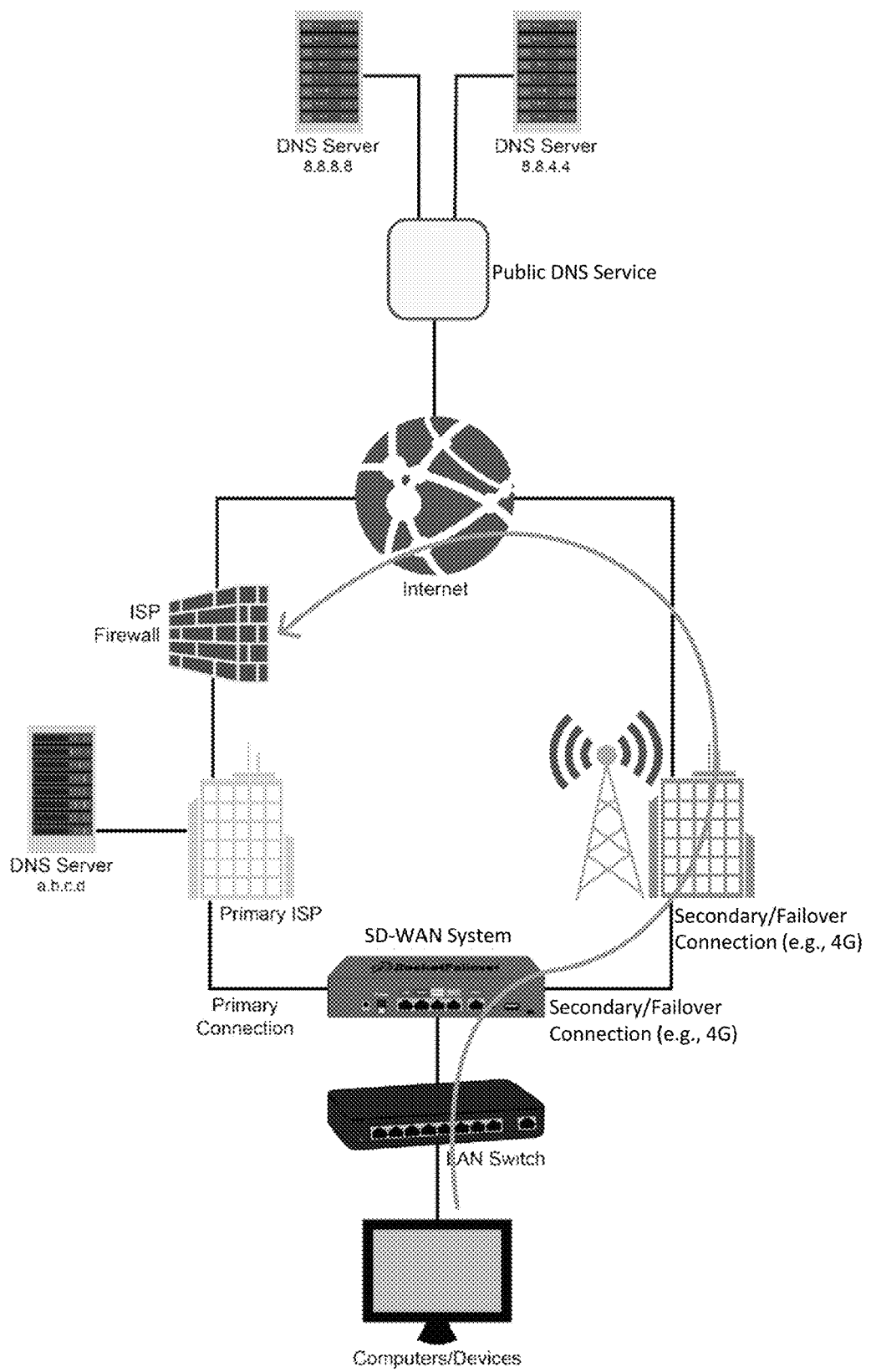
Figure 15:
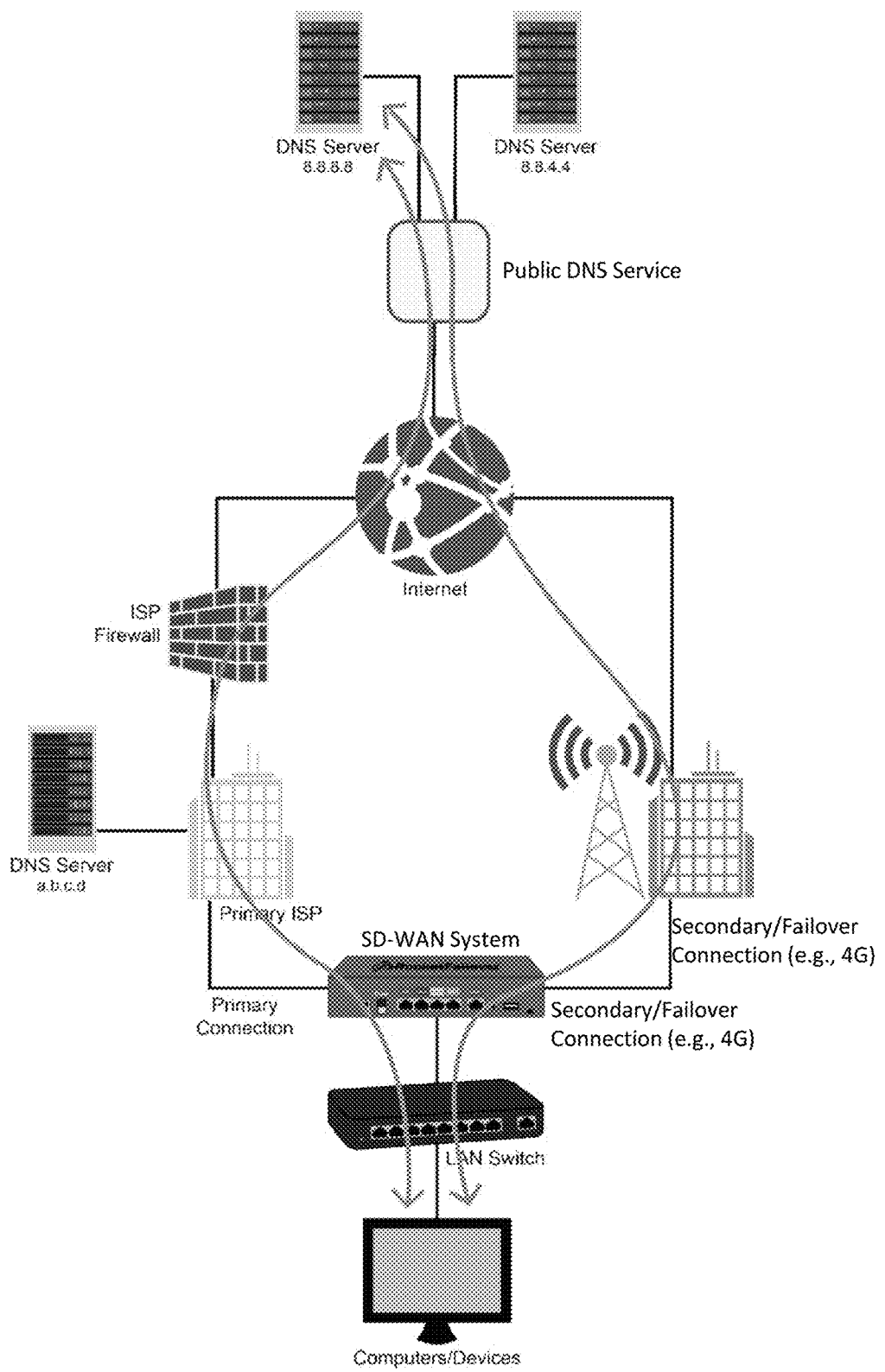

In some cases this type of SD-WAN monitoring system can be implemented with respect to DNS. As is known, it is common practice for Internet Service Providers to block DNS requests for external hosts, which is referred to as DNS forwarding. This is done to prevent DNS amplification attacks where an attacker sends a small request and a server returns a larger amount of information as a response. As shown in FIG. 13, if DNS within a local network is configured to use the DNS servers of an ISP, but the ISP blocks DNS requests from the internet as described above, then, when a failover event occurs, as shown in FIG. 14, DNS resolution will also fail for all the hosts on the network segment because their requests will be sent to their primary ISP by way of a secondary ISP. In some cases this behavior can be corrected by configuring DNS to use public DNS servers as shown in FIG. 15. With this arrangement, DNS will work correctly on either connection.

Figure 16:
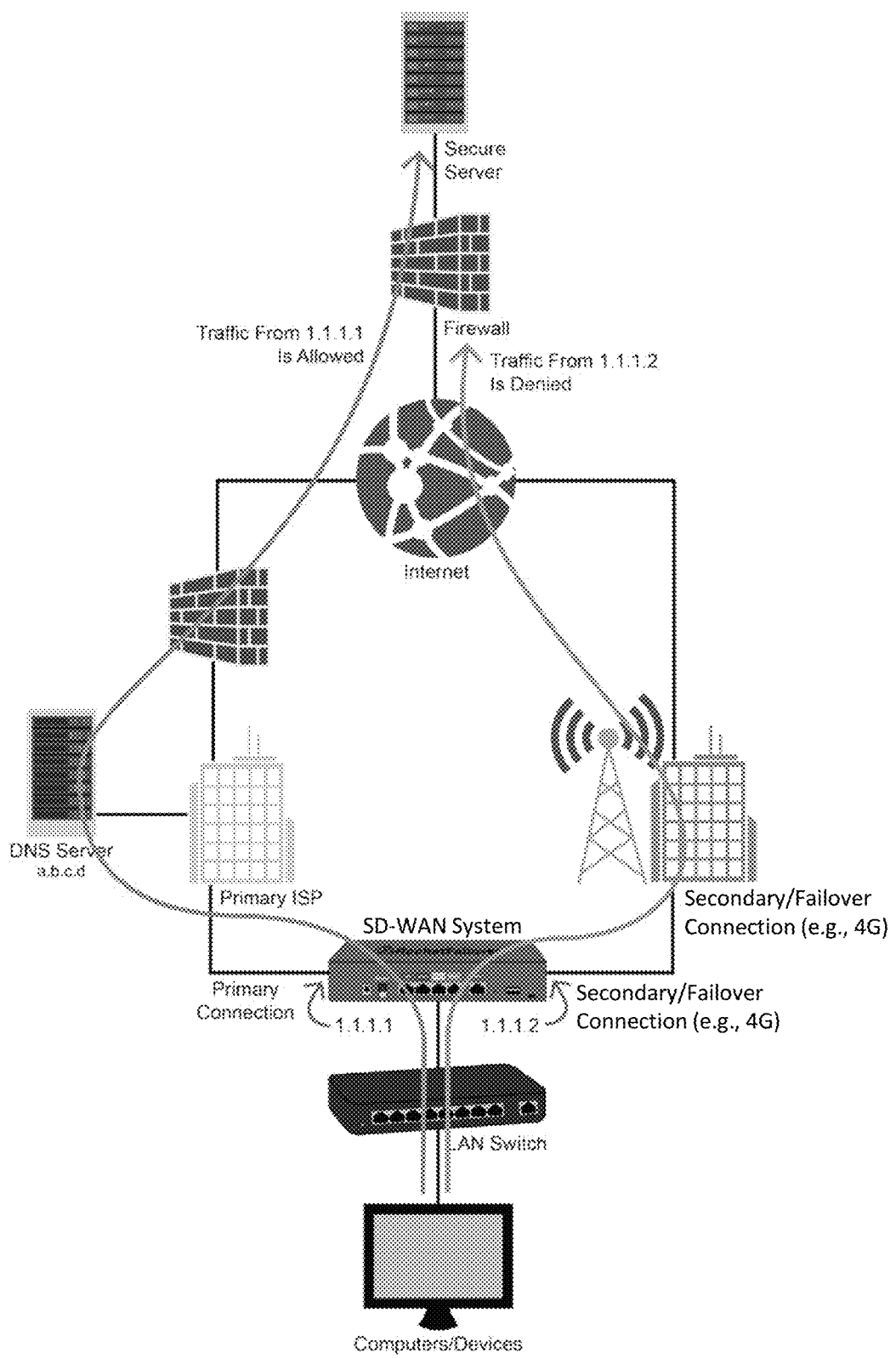
Figure 17:
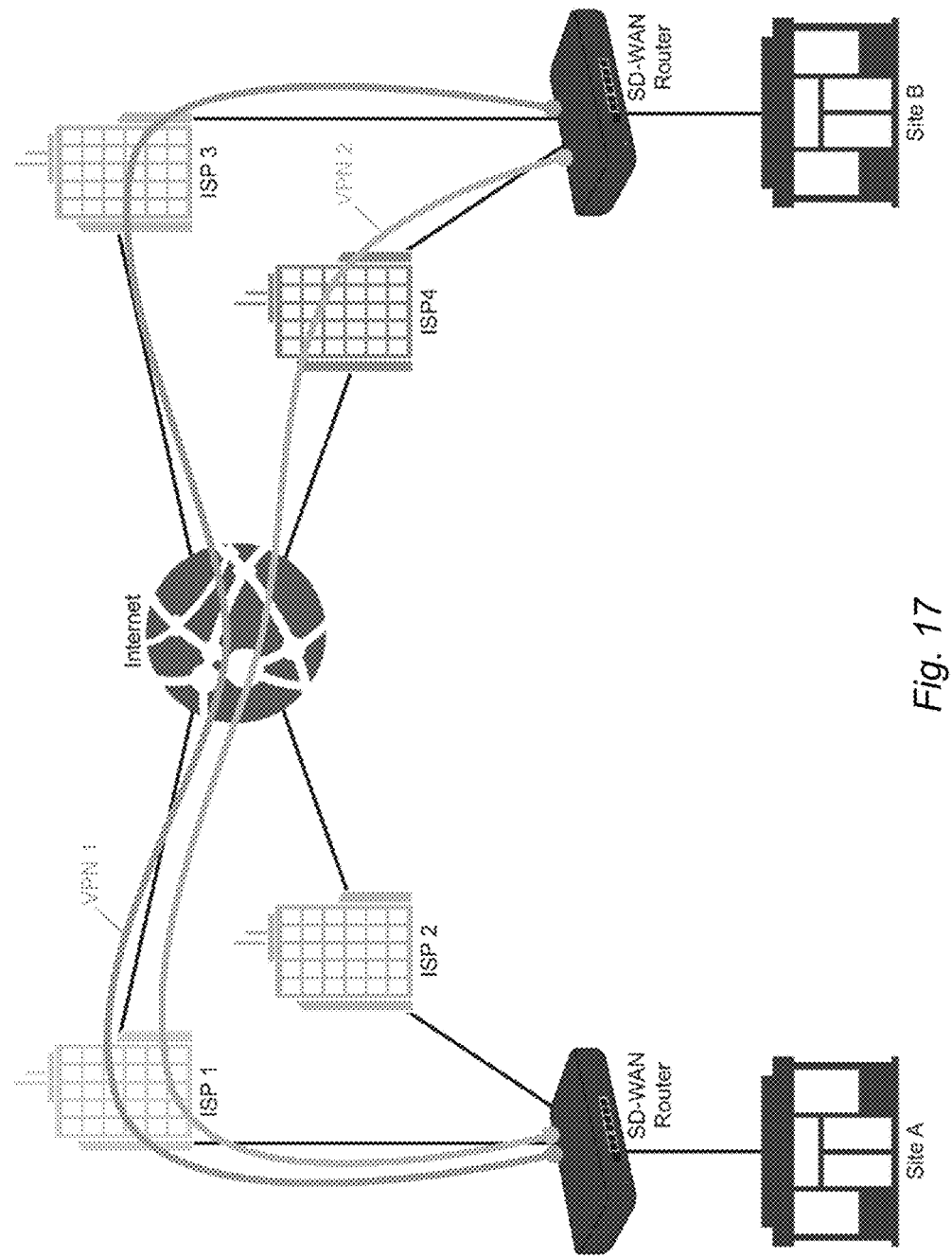
FIGS. 17-20 are schematic network diagrams illustrating possible implementations related to monitoring traffic-flows via independent, super positioned flow-monitoring packets which mirror the state of the SD-WAN traffic flows but which do not have to be wrapped-inside of the flows themselves.
Figure 18:
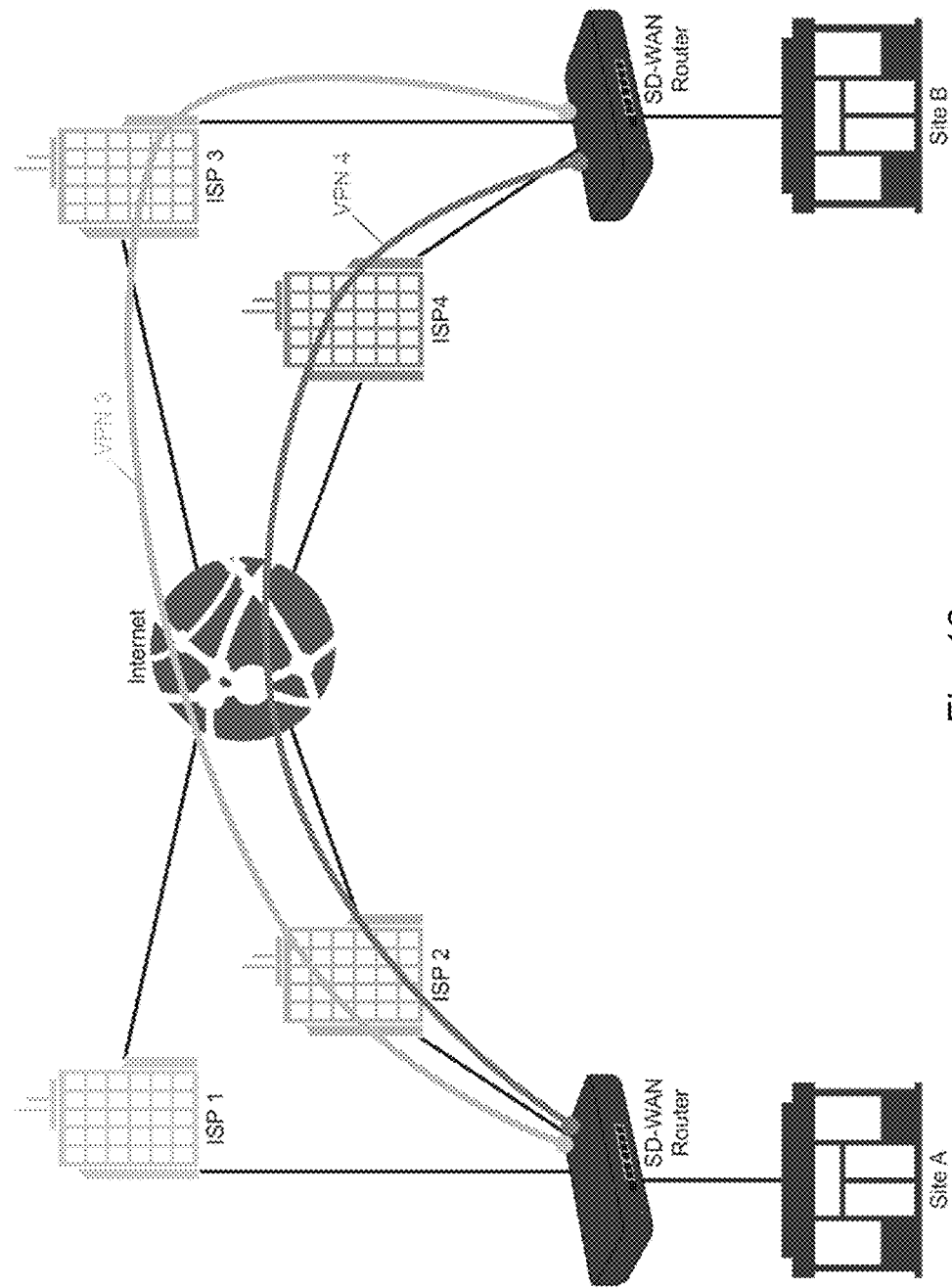
Figure 19:
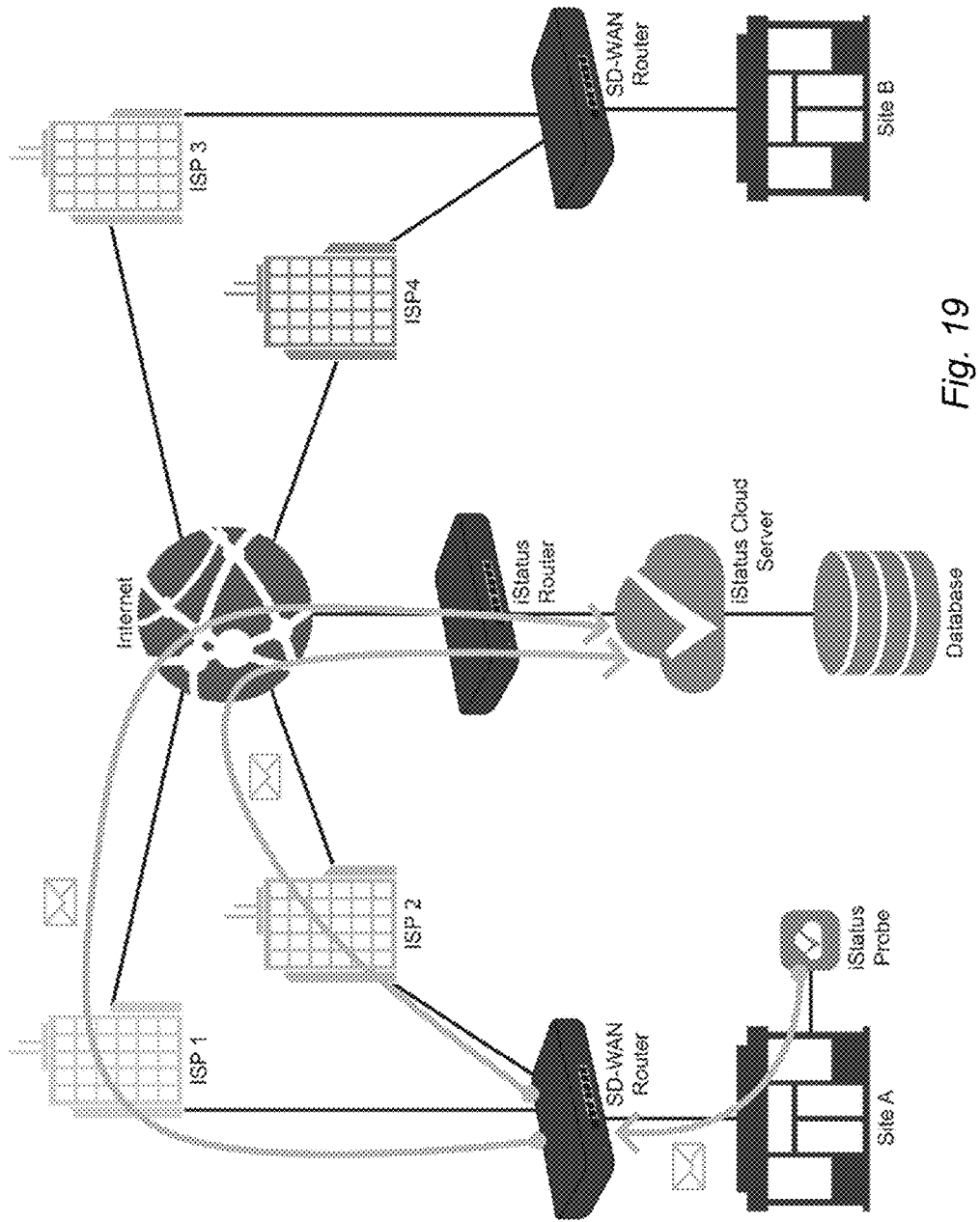
Figure 20:
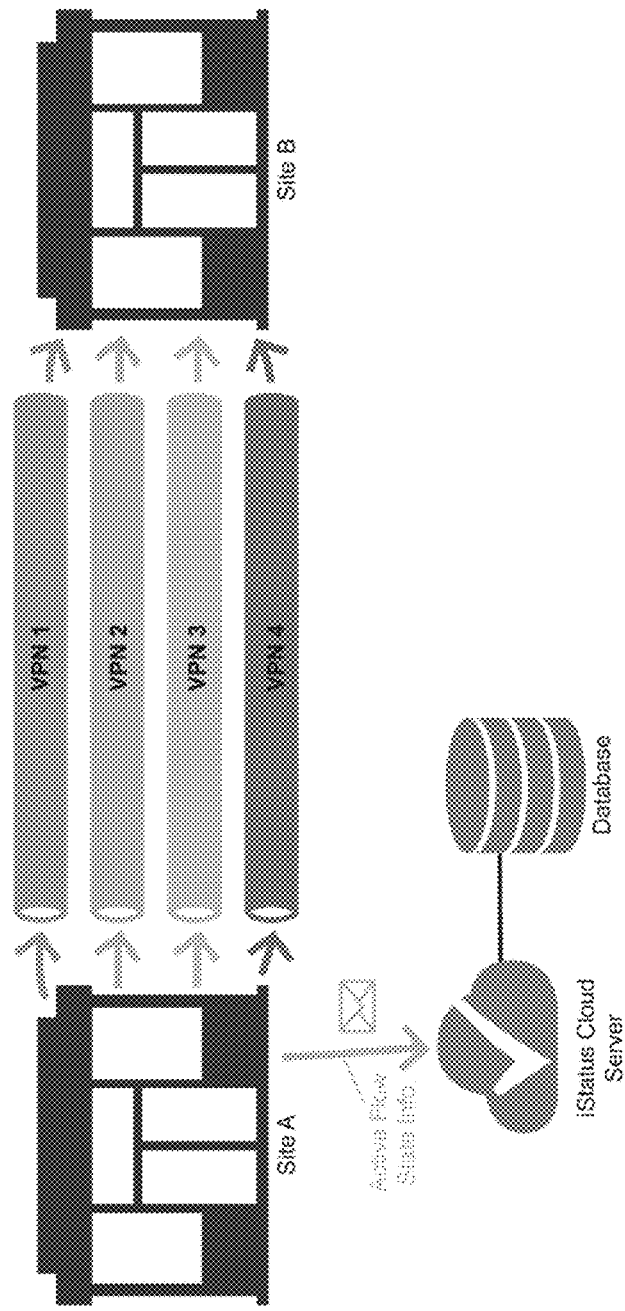

Referring to FIG. 16, in some cases an SD-WAN monitoring system with an AI controller can be used to configure a web service to only allow inbound requests from a company's static external IP address. This could allow those services to fail (and become inaccessible) during a failover or SD-WAN traffic steering event. In this way, the AI-enabled SD-WAN monitoring system can identify the issue and the critical websites or web services affected, and then automatically remediate the problem or alert a user to enable manual remediation.

Example 2: AI Controller with NPM, Validating a Connection, and SD-WAN Flow Tracking According to some implementations, an SD-WAN monitoring system incorporating the combination of these technologies may determine that all traffic to ExampleWebsite.com is failing over specific carriers. For example the system may recognize that all this traffic fails whenever remote sites are using ISP #1 as a carrier. In response, the SD-WAN monitoring system could dynamically generate SD-WAN traffic steering rules and send the rules to all outlying sites with ISP #1 connections, thereby proactively fixing the problem for all customers.

Example 3: Using AI Along with NPM, Detecting Congestion, and SD-WAN Flow Tracking According to some implementations, an SD-WAN monitoring system incorporating this combination of technologies can potentially identify time-of-day based problems which are global to all traffic, or which may be related to only specific websites. The monitoring system could remediate this problem automatically by either forcing a failover event or by modifying SD-WAN traffic steering rules.

Although the present disclosure has been described with references to various embodiments, persons skilled in the art will recognized that changes may be made in form and detail without departing from the spirit and scope of this disclosure.

What is claimed is:

1. A network failover and connection monitoring system, comprising:
 a. a server comprising a processor circuit, a non-transitory memory device, and a first traffic flow target for receiving a first test traffic flow from a probe; and
 b. a network device comprising a traffic classifier, the network device constructed and arranged to create a first network connection and a second network connection,
  wherein the traffic classifier is constructed and arranged to apply a set of software-defined wide area network (SD-WAN) classifier rules to route traffic over the first network connection and the second network connection and wherein the network device transitions between the first network connection and the second network connection in accordance with the SD-WAN classifier rules,
  wherein the SD-WAN classifier rules comprise a first SD-WAN rule configured to conditionally route both a first traffic flow and the first test flow over the second network connection,
  wherein the server is constructed and arranged to determine whether the first test flow was received over the second network connection,
  wherein the server is constructed and arranged to determine that the first SD-WAN rule is active in response to determining that the first test flow was received over the second network connection, and
  wherein the server is constructed and arranged to determine that the first SD-WAN rule is inactive in response to determining that the first test flow was not received over the second network connection.

2. The system of claim 1, wherein the first network connection is a wired connection.

3. The system of claim 2, wherein the second network connection is a wireless connection.

4. The system of claim 1, further comprising a dashboard in electronic communication with the server, wherein the server is constructed and arranged to update the dashboard to reflect that the first SD-WAN rule is active or inactive.

5. The system of claim 1, further comprising a third network connection.

6. The system of claim 1, wherein the network device is a failover device.

7. The system of claim 1, wherein the monitoring system is local area network (LAN) hosted monitoring system.

8. The system of claim 1, further comprising a probe constructed and arranged to generate the first test traffic flow.

9. The system of claim 8, wherein the probe is a dedicated hardware probe.

10. The system of claim 8, wherein the probe is a software-based probe.

11. The system of claim 1, wherein the server is constructed and arranged to evaluate a source address of the first test traffic flow to determine whether the first test traffic flow was received over the second network connection.

12. The system of claim 1, wherein the network device comprises a firewall.

13. A network failover and connection monitoring system, comprising:
 a. a network device comprising a traffic classifier, a first network interface for a first network connection, and a second network interface for a second network connection;
 b. a server comprising a processor circuit, a non-transitory memory device, and a first traffic flow target; and
 c. a probe constructed and arranged to send a first test traffic flow to the first traffic flow target;
  wherein the traffic classifier is constructed and arranged to apply a set of software-defined wide area network (SD-WAN) classifier rules to route traffic over the first network connection and the second network connection and wherein the network device transitions between the first network connection and the second network connection in accordance with the SD-WAN classifier rules, wherein the SD-WAN classifier rules comprise a first SD-WAN rule configured to conditionally route both a first traffic flow and the first test traffic flow over one of the first and second network connections, wherein the server is constructed and arranged to determine whether the first test traffic flow was received over the one of the first and second network connections, wherein the server is constructed and arranged to determine that the first SD-WAN rule is active in response to determining that the first test traffic flow was received over the one of the first and second network connections, and wherein the server is constructed and arranged to determine that the first SD-WAN rule is inactive in response to determining that the first test traffic flow was not received over the one of the first and second network connections.

14. The system of claim 13, wherein the server is constructed and arranged to evaluate a source address of the first test traffic flow to determine whether the first test traffic flow was received over the one of the first and second network connections.

15. The system of claim 13, wherein the probe is a dedicated hardware probe.

16. The system of claim 13, wherein the first network connection is a wired connection and the second network connection is a wireless connection.

17. The system of claim 13, further comprising a dashboard in electronic communication with the server, wherein the server is constructed and arranged to update the dashboard to reflect that the first SD-WAN rule is active or inactive.

18. A network failover and connection monitoring system, comprising:
a. a server comprising a processor circuit, a non-transitory memory device, and a plurality of traffic flow targets;
b. a network device constructed and arranged to create a plurality of network connections, the network device comprising a traffic classifier comprising a plurality of software-defined wide area network (SD-WAN) rules, each SD-WAN rule comprising a traffic destination, a corresponding one of the plurality of traffic flow targets, a first network connection and a second network connection; and
c. a probe constructed and arranged to send a corresponding test traffic flow to each of the plurality of traffic flow targets;

wherein the traffic classifier is constructed and arranged to apply the plurality of SD-WAN rules to route traffic over the plurality of network connections, wherein, for each SD-WAN rule,
the network device is constructed and arranged to conditionally route both network traffic to a corresponding traffic destination and the corresponding test traffic flow to the corresponding traffic flow target over a first connection of the plurality of network connections or a second connection of the plurality of network connections, wherein the server is constructed and arranged to determine that the SD-WAN rule is active in response to determining that the corresponding test traffic flow was received over the second network connection, and wherein the server is constructed and arranged to determine that the SD-WAN rule is inactive in response to determining that the corresponding test traffic flow was received over the first network connection.

19. The system of claim 18, wherein the server is constructed and arranged to evaluate a source address of the corresponding test traffic flow to determine whether the corresponding test traffic flow was received over the first network connection.

20. The system of claim 18, further comprising a dashboard in electronic communication with the server, wherein the server is constructed and arranged to update the dashboard to reflect that each of the plurality of SD-WAN rules is active or inactive.

* * * * *